US012587890B2

(12) United States Patent
Jeong et al.

(10) Patent No.: US 12,587,890 B2
(45) Date of Patent: Mar. 24, 2026

(54) METHOD AND DEVICE FOR MEASURING QUALITY AND PDU LOSS RATE IN MOBILE COMMUNICATION SYSTEM FOR XR SERVICE

(71) Applicant: Samsung Electronics Co., Ltd., Suwon-si (KR)

(72) Inventors: Seungbeom Jeong, Suwon-si (KR); Hyunjeong Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 344 days.

(21) Appl. No.: 18/335,535

(22) Filed: Jun. 15, 2023

(65) Prior Publication Data

US 2024/0022941 A1 Jan. 18, 2024

(30) Foreign Application Priority Data

Jul. 13, 2022 (KR) ........................ 10-2022-0086450

(51) Int. Cl.
| | |
|---|---|
| *H04W 24/10* | (2009.01) |
| *H04L 41/40* | (2022.01) |
| *H04L 41/5067* | (2022.01) |
| *H04L 43/06* | (2022.01) |
| *H04L 43/0829* | (2022.01) |

(Continued)

(52) U.S. Cl.
CPC ............. *H04W 24/10* (2013.01); *H04L 41/40* (2022.05); *H04L 41/5067* (2013.01); *H04L*

*43/06* (2013.01); *H04L 43/0829* (2013.01); *H04L 67/131* (2022.05); *H04W 8/24* (2013.01)

(58) Field of Classification Search
CPC .... H04W 24/10; H04W 8/24; H04L 43/0829; H04L 41/5067; H04L 41/40; H04L 43/06; H04L 67/131
See application file for complete search history.

(56) References Cited

U.S. PATENT DOCUMENTS

| | | | | |
|---|---|---|---|---|
| 2023/0144788 A1* | 5/2023 | Fang | ................. | H04W 36/0079 |
| | | | | 370/331 |
| 2023/0231779 A1* | 7/2023 | Centonza | ............ | H04L 41/5067 |
| | | | | 370/252 |

(Continued)

FOREIGN PATENT DOCUMENTS

| | | | | |
|---|---|---|---|---|
| KR | 10-2022-0136810 A | 10/2022 | | |
| WO | WO-2022005379 A1 * | 1/2022 | ............ | H04W 24/10 |

(Continued)

*Primary Examiner* — Tonia L Dollinger

(74) *Attorney, Agent, or Firm* — Jefferson IP Law, LLP

(57) ABSTRACT

The disclosure relates to a $5^{th}$ generation (5G) or $6^{th}$ generation (6G) communication system for supporting a higher data transmission rate. A method for configuring a quality measurement by a network node in a mobile communication system is provided. The method includes receiving, from a user equipment (UE), performance information indicating that the UE supports a quality of experience (QoE) measurement for an extended reality (XR) service, transmitting, to the UE, a QoE measurement configuration indicating parameters to be reported for the QoE measurement, and receiving, from the UE, a QoE measurement report including at least one of the parameters.

12 Claims, 9 Drawing Sheets

(51) Int. Cl.
    *H04L 67/131*       (2022.01)
    *H04W 8/24*        (2009.01)

(56)           References Cited

U.S. PATENT DOCUMENTS

| | | | |
|---|---|---|---|
| 2023/0308919 A1* | 9/2023 | Barac | H04L 65/80 |
| 2024/0114367 A1* | 4/2024 | Kazmi | H04W 24/04 |

FOREIGN PATENT DOCUMENTS

| | | | |
|---|---|---|---|
| WO | WO-2024063486 A1 * | 3/2024 | H04W 24/02 |
| WO | WO-2024066878 A1 * | 4/2024 | H04W 28/0289 |
| WO | WO-2024147574 A1 * | 7/2024 | H04W 24/04 |
| WO | WO-2025163106 A1 * | 8/2025 | H04W 28/02 |
| WO | WO-2025168664 A1 * | 8/2025 | H04W 28/24 |

* cited by examiner

115

308

METHOD AND DEVICE FOR MEASURING QUALITY AND PDU LOSS RATE IN MOBILE COMMUNICATION SYSTEM FOR XR SERVICE

CROSS-REFERENCE TO RELATED APPLICATION(S)

This application is based on and claims priority under 35 U.S.C. § 119(a) of a Korean patent application number 10-2022-0086450, filed on Jul. 13, 2022, in the Korean Intellectual Property Office, the disclosure of which is incorporated by reference herein in its entirety.

BACKGROUND

1. Field

The disclosure relates to a method and device providing quality measurement in a mobile communication system.

2. Description of Related Art $5^{th}$ generation (5G) mobile communication technology defines a wide frequency band to enable fast transmission speed and new services and may be implemented in frequencies below 6 GHz ('sub 6 GHz'), such as 3.5 GHz, as well as in ultra-high frequency bands ('above 6 GHz'), such as 28 GHz and 39 GHz called millimeter wave (mmWave). Further, $6^{th}$ generation (6G) mobile communication technology, which is called a beyond 5G system, is considered to be implemented in terahertz bands (e.g., 95 GHz to 3 THz) to achieve a transmission speed 50 times faster than 5G mobile communication technology and ultra-low latency reduced by $\frac{1}{10}$.

In the early stage of 5G mobile communication technology, standardization was conducted on beamforming and massive multiple input multiple output (MIMO) for mitigating propagation pathloss and increasing propagation distance in ultrahigh frequency bands, support for various numerologies for efficient use of ultrahigh frequency resources (e.g., operation of multiple subcarrier gaps), dynamic operation of slot format, initial access technology for supporting multi-beam transmission and broadband, definition and operation of bandwidth part (BWP), new channel coding, such as low density parity check (LDPC) code for massive data transmission and polar code for high-reliable transmission of control information, L2 preprocessing, and network slicing for providing a dedicated network specified for a specific service, so as to meet performance requirements and support services for enhanced mobile broadband (eMBB), ultra-reliable low-latency communications (URLLC), and massive machine-type communications (mMTC).

Currently, improvement and performance enhancement in the initial 5G mobile communication technology is being discussed considering the services that 5G mobile communication technology has intended to support, and physical layer standardization is underway for technology, such as vehicle-to-everything (V2X) for increasing user convenience and assisting autonomous vehicles in driving decisions based on the position and state information transmitted from the VoNR, new radio unlicensed (NR-U) aiming at the system operation matching various regulatory requirements, new radio (NR) user equipment (UE) power saving, non-terrestrial network (NTN) which is direct communication between UE and satellite to secure coverage in areas where communications with a terrestrial network is impossible, and positioning technology.

Also being standardized are radio interface architecture/protocols for technology of industrial Internet of things (IIoT) for supporting new services through association and fusion with other industries, integrated access and backhaul (IAB) for providing nodes for extending the network service area by supporting an access link with the radio backhaul link, mobility enhancement including conditional handover and dual active protocol stack (DAPS) handover, 2-step random access channel (RACH) for NR to simplify the random access process, as well as system architecture/service fields for 5G baseline architecture (e.g., service based architecture or service based interface) for combining network functions virtualization (NFV) and software-defined networking (SDN) technology and mobile edge computing (MEC) for receiving services based on the position of the UE.

As 5G mobile communication systems are commercialized, soaring connected devices would be connected to communication networks so that reinforcement of the function and performance of the 5G mobile communication system and integrated operation of connected devices are expected to be needed. To that end, new research is to be conducted on, e.g., extended reality (XR) for efficiently supporting, e.g., augmented reality (AR), virtual reality (VR), and mixed reality (MR), and 5G performance enhancement and complexity reduction using artificial intelligence (AI) and machine learning (ML), support for AI services, support for metaverse services, and drone communications.

Further, development of such 5G mobile communication systems may be a basis for multi-antenna transmission technology, such as new waveform for ensuring coverage in 6G mobile communication terahertz bands, full dimensional MIMO (FD-MIMO), array antenna, and large scale antenna, full duplex technology for enhancing the system network and frequency efficiency of 6G mobile communication technology as well as reconfigurable intelligent surface (RIS), high-dimensional space multiplexing using orbital angular momentum (OAM), metamaterial-based lens and antennas to enhance the coverage of terahertz band signals, AI-based communication technology for realizing system optimization by embedding end-to-end AI supporting function and using satellite and artificial intelligence (AI) from the step of design, and next-generation distributed computing technology for implementing services with complexity beyond the limit of the UE operation capability by way of ultrahigh performance communication and computing resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and device providing quality measurement in a mobile communication system.

Another aspect of the disclosure is to provide a method and device performing quality of experience (QoE) measurement based on a set of data units in a mobile communication system.

Another aspect of the disclosure is to provide a method and device supporting QoE measurement based on a set of data units in a mobile communication system.

Additional aspects will be set forth in part in the description which follows and, in part, will be apparent from the description, or may be learned by practice of the presented embodiments.

In accordance with an aspect of the disclosure, a method for configuring a quality measurement by a network node in a mobile communication system is provided. The method includes receiving, from a UE, performance information indicating that the UE supports a QoE measurement for an XR service, transmitting, to the UE, a QoE measurement configuration indicating parameters to be reported for the QoE measurement, and receiving, from the UE, a QoE measurement report including at least one of the parameters.

In accordance with another aspect of the disclosure, a network node configuring a quality measurement in a mobile communication system is provided. The network node includes a transceiver and a controller configured to control the transceiver. The controller may be configured to receive, from a UE, performance information indicating that the UE supports a QoE measurement for an XR service, transmit, to the UE, a QoE measurement configuration indicating parameters to be reported for the QoE measurement, and receive, from the UE, a QoE measurement report including at least one of the parameters.

In accordance with another aspect of the disclosure, a method for performing a quality measurement by a UE in a mobile communication system is provided. The method includes transmitting, to a base station, performance information indicating that the UE supports a QoE measurement for an XR service, receiving, from the base station, a QoE measurement configuration indicating parameters to be reported for the QoE measurement, and transmitting, to the base station, a QoE measurement report including at least one of the parameters.

In accordance with an aspect of the disclosure, a UE performing a quality measurement in a mobile communication system is provided. The UE includes a transceiver and a controller configured to control the transceiver. The controller may be configured to transmit, to a base station, performance information indicating that the UE supports a QoE measurement for an XR service, receive, from the base station, a QoE measurement configuration indicating parameters to be reported for the QoE measurement, and transmit, to the base station, a QoE measurement report including at least one of the parameters.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures

DETAILED DESCRIPTION

Figure 1:
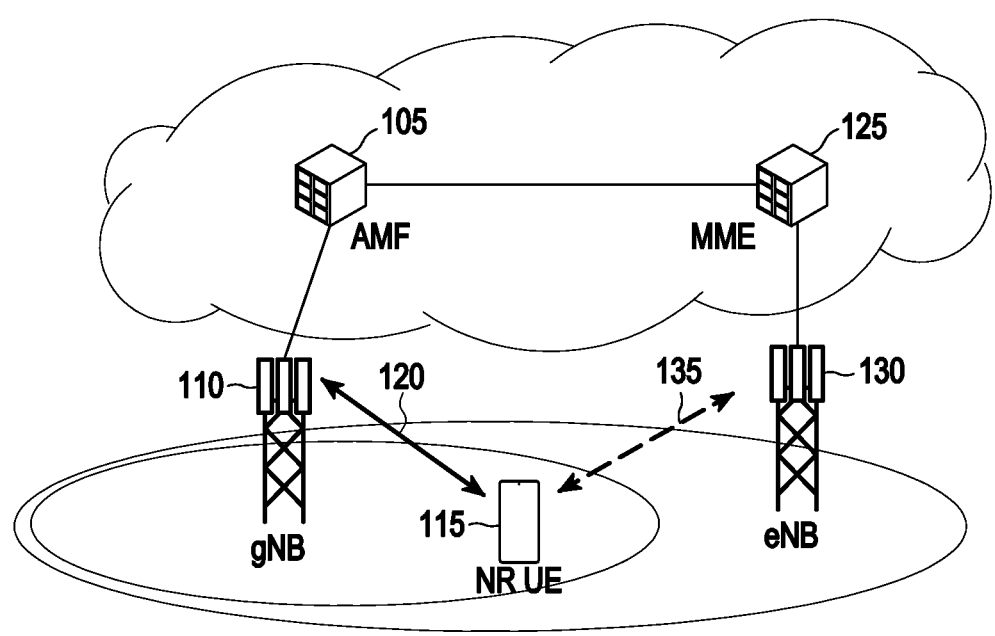
FIG. 1 is a view illustrating a structure of a next-generation mobile communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Advantages and features of the disclosure, and methods for achieving the same may be understood through the embodiments to be described below taken in conjunction with the accompanying drawings. However, the disclosure is not limited to the embodiments disclosed herein, and various changes may be made thereto. The embodiments disclosed herein are provided only to inform one of ordinary skilled in the art of the category of the disclosure. The disclosure is defined only by the appended claims.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement embodiments, the functions mentioned in the blocks may occur in different orders. For example, two blocks that are consecutively shown may be performed substantially simultaneously or in a reverse order depending on corresponding functions.

As used herein, the term "unit" means a software element or a hardware element such as a field-programmable gate array (FPGA) or an application specific integrated circuit (ASIC). A unit plays a certain role. However, a 'unit' is not limited to software or hardware. A 'unit' may be configured in a storage medium that may be addressed or may be configured to execute one or more processors. In some embodiments, a 'unit' may include elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. Functions provided within the components and the 'units' may be combined into smaller numbers of components and 'units' or further separated into additional components and 'units'. Further, the components and 'units' may be implemented to execute one or more central processing units (CPUs) in a device or secure multimedia card. In some embodiments, a " . . . unit" may include one or more processors.

As used herein, the term 'user equipment (UE)' may also be referred to as a mobile station (MS), user terminal (UT), wireless terminal, access terminal (AT), subscriber unit, subscriber station (SS), wireless device, wireless communication device, wireless transmit/receive unit (WTRU), mobile node, or mobile or may be referred to in other terms. Various embodiments of the terminal may include cellular phones, smart phones with wireless communication capabilities, personal digital assistants (PDAs) with wireless communication capabilities, wireless modems, portable computers with wireless communication capabilities, capturing/recording/shooting/filming devices, such as digital cameras, having wireless communication capabilities, game players with wireless communications capabilities, music storage and playback home appliances with wireless communications capabilities, Internet home appliances capable of wireless Internet access and browsing, or portable units or devices incorporating combinations of those capabilities. Further, the terminal may include a machine to machine (M2M) terminal or a machine-type communication (MTC) terminal/device, but is not limited thereto.

Further, although embodiments are described below with reference to a communication system using 5G wireless communication, embodiments of the disclosure may also apply to other communication systems with similar technical background or features. Further, embodiments of the disclosure may be modified in such a range as not to significantly depart from the scope of the disclosure under the determination by one of ordinary skill in the art and such modifications may be applicable to other communication systems.

FIG. 1 is a view illustrating a structure of a next-generation (new radio (NR)) mobile communication system according to an embodiment of the disclosure.

Referring to FIG. 1, as illustrated, a radio access network of a next-generation mobile communication system (new Radio (NR)) may include a next-generation base station (new radio node B, hereinafter, gNB 110) (or may be referred to as a radio access network (NG-RAN)) and an NR core network entity (e.g., an access management function (AMF) 105). A new radio user equipment (hereinafter, NR UE or UE) 115 may access an external network through the gNB 110 and the AMF 105.

The gNB 110 may be configured to perform operations corresponding to the evolved node B (eNB) 130 of the long term evolution (LTE) system. The gNB 110 may establish a wireless channel 120 with the NR UE 115 and provide an enhanced service (e.g., an XR service) as compared to the legacy node B (e.g., the eNB 130). In the next-generation mobile communication system, all user traffic may be serviced through a shared channel, and the gNB 110 may perform scheduling by compiling state information such as the buffer state, available transmission power state, and channel state of UEs (including, e.g., the NR UE 115).

The gNB 110 usually controls a plurality of cells. To implement ultra-high data rate transmission as compared with the LTE, a bandwidth higher than the existing maximum bandwidth may be provided, and the orthogonal frequency division multiplexing (hereinafter, OFDM) may be used as the radio access technology, and beamforming technology may be additionally combined. Further, the system applies adaptive modulation & coding (AMC) that determines a modulation scheme and a channel coding rate in compliance with the channel state of the UE.

The AMF 105 may perform functions such as mobility support, bearer configuration, and quality of service (QoS) configuration. The AMF is responsible for various control functions as well as the mobility management function for the UE (e.g., the NR UE 115), and may be connected to a plurality of base stations (e.g., the gNB 110 and the eNB 130). The next-generation mobile communication system may interwork with the LTE system. In another embodiment, the AMF 105 may be connected to an LTE core network entity (e.g., the mobile management entity (MME) 125) through the network interface. The MME 125 may be connected to the eNB 130 of the LTE system. When LTE-NR dual connectivity is supported, the NR UE 115 may transmit and receive data by establishing a wireless channel 120 with the gNB 110 while maintaining the wireless channel 135 with the eNB 130.

Figure 2:
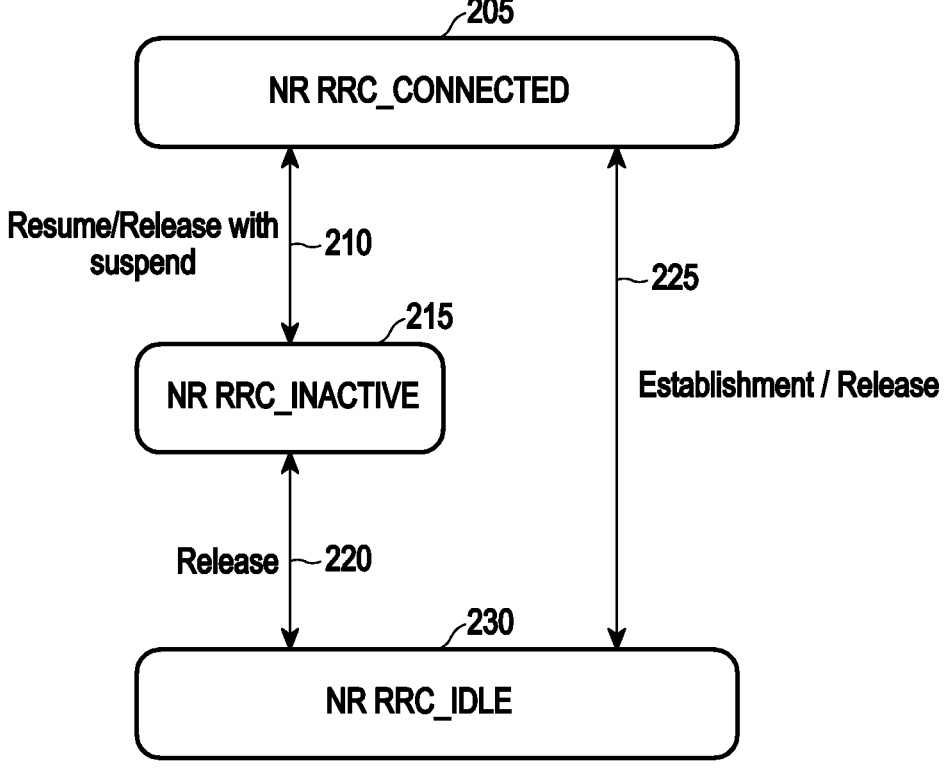
FIG. 2 is a view illustrating a radio access state transition in a next-generation mobile communication system according to an embodiment of the disclosure.

FIG. 2 is a view illustrating a radio access state transition in a next-generation mobile communication system according to an embodiment of the disclosure.

Referring to FIG. 2, the next-generation mobile communication system may support three radio resource control (RRC) states. The connected mode (RRC_CONNECTED) 205 is a state in which the UE may transmit and receive data. The standby mode (RRC_IDLE) 230 is a state in which the UE monitors whether paging is transmitted to the UE. The two modes 205 and 230 are also applied to the LTE system, and the detailed description thereof may be similar to that of the LTE system.

The next-generation mobile communication system may support an RRC inactive (RRC_INACTIVE) state 215. In the RRC_INACTIVE state 215, the UE context may be maintained in the base station (e.g., the gNB 110) and the UE (e.g., the NR UE 115), and radio access network (RAN)-based paging may be supported. Features of the RRC_I-NACTIVE state are listed as follows.

Cell re-selection mobility;

CN-NR RAN connection (both C/U-planes) has been established for UE;

The UE AS context is stored in at least one gNB and the UE;

Paging is initiated by NR RAN;

RAN-based notification area is managed by NR RAN; or

NR RAN knows the RAN-based notification area which the UE belongs to.

The RRC_INACTIVE state 215 may transition to the connected mode (e.g., the RRC_CONNECTED mode 205) or the standby mode (e.g., the RRC_IDLE mode 230) using a specific procedure. In operation 210, the RRC_INACTIVE mode 215 may be switched to the connected mode 205 according to a resume procedure, or the connected mode may be switched to the RRC_INACTIVE mode using a release procedure including suspend configuration information. Operation 210 may include one or more steps of transmitting and receiving one or more RRC messages between the UE and the base station. In operation 220, the RRC_INACTIVE mode 215 may be switched to the standby mode 230 through the release procedure. Switching between the connected mode 205 and the standby mode 230 may follow LTE technology. According to another embodiment, in operation 225, switching between the modes 205 and 230 may be performed through an establishment or release procedure.

Figure 3:
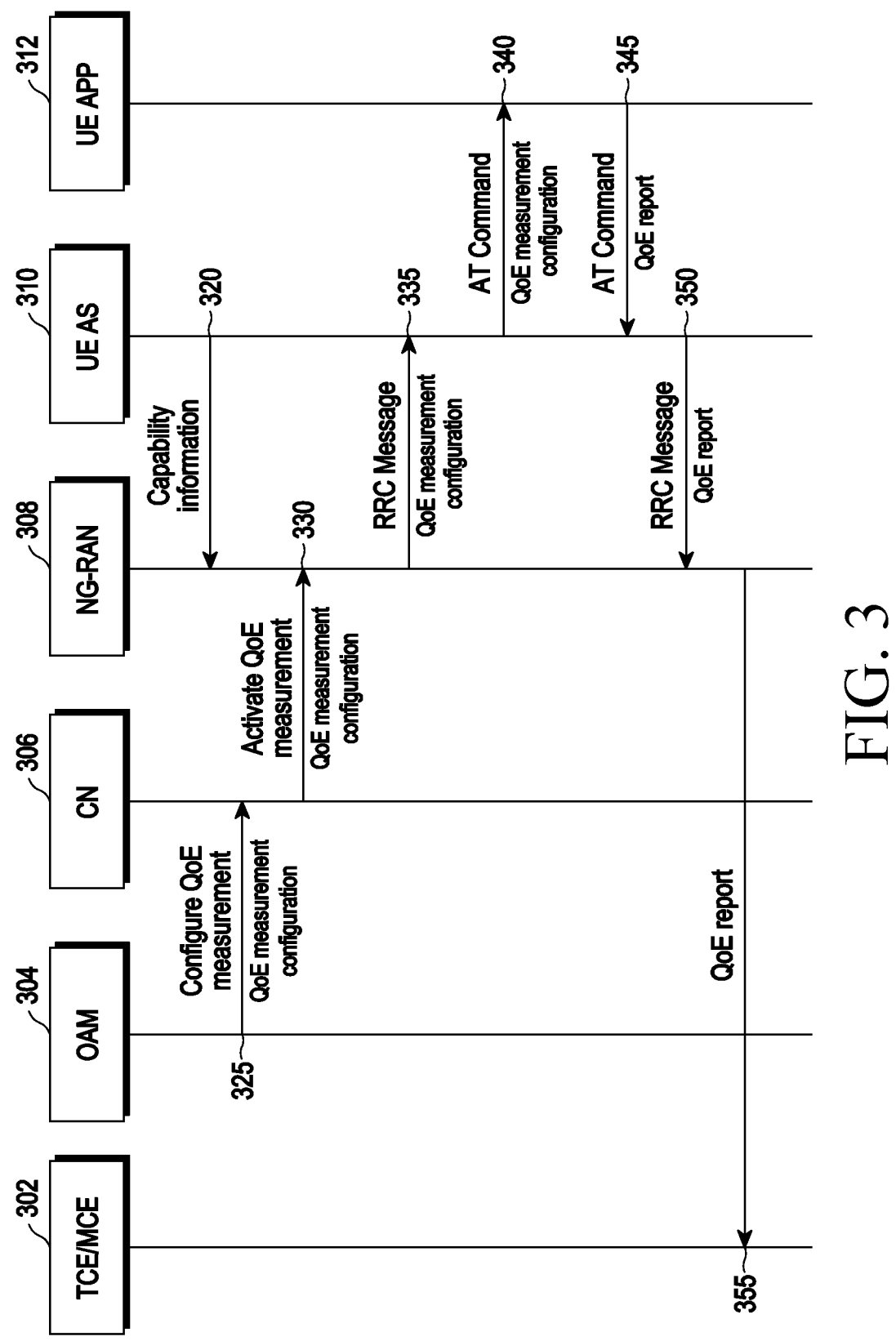
FIG. 3 is a flowchart illustrating a procedure for configuring and reporting a signaling-based QoE measurement according to an embodiment of the disclosure.

FIG. 3 is a flowchart illustrating a procedure for configuring and reporting a signaling-based quality of experience (QoE) measurement according to an embodiment of the disclosure.

Referring to FIG. 3, in operation 320, the access stratum layer (AS) 310 of the UE (e.g., NR UE 115) may transmit information indicating whether QoE measurement is supported according to service types (e.g., streaming, multimedia telephony service for internet protocol (IP) multimedia subsystem (IMS) (MTSI), or virtual reality (VR)) to the base station (e.g., the NG-RAN 308 or the gNB 110) through the UE capability message (e.g., UECapabilityInformation). The UE capability message may include information indicating whether the UE supports RAN visible QoE measurement for each service type (e.g., streaming or VR). The UE capability message may include information indicating whether the UE supports UL RRC segmentation of the QoE report message. In another embodiment, the UE capability message may include ASN.1 information and a related parameter description as shown in Table 1 below.

TABLE 1

| QoE-Parameters-r17 ::= | SEQUENCE { |
|---|---|
| qoe-Streaming-MeasReport-r17 OPTIONAL, | ENUMERATED {supported} |
| qoe-MTSI-MeasReport-r17 OPTIONAL, | ENUMERATED {supported} |
| qoe-VR-MeasReport-r17 OPTIONAL, | ENUMERATED {supported} |
| ran-VisibleQoE-Streaming-MeasReport-r17 OPTIONAL, | ENUMERATED {supported} |
| ran-VisibleQoE-VR-MeasReport-r17 OPTIONAL, | ENUMERATED {supported} |
| ul-MeasurementReportAppLayer-Seg-r17 OPTIONAL, | ENUMERATED {supported} |
| ... } | |
| QoE measurement parameters | |

| Definitions for parameters | Per | M | FDD-TDD DIFF | FR1-FR2 DIFF |
|---|---|---|---|---|
| qoe-Streaming-MeasReport-r17 Indicates whether the UE supports NR QoE Measurement Collection for streaming services, see TS 26.247 [29]. | UE | No | No | No |
| qoe-MTSI-MeasReport-r17 Indicates whether the UE supports NR QoE Measurement Collection for MTSI services, see TS 26.114 [30]. | UE | No | No | No |
| qoe-VR-Meas Report-r17 Indicates whether the UE supports NR QoE Measurement Collection for VR services, see TS 26.118 [31]. | UE | No | No | No |
| ran-VisibleQoE-Streaming-MeasReport-r17 Indicates whether the UE supports RAN visible QoE Measurement Collection for streaming services. | UE | No | No | No |

TABLE 1-continued

| | | | | |
|---|---|---|---|---|
| ran-VisibleQoE-VR-MeasReport-r17 Indicates whether the UE supports RAN visible QoE Measurement Collection for VR services. | UE | No | No | No |
| ul-MeasurementReportAppLayer-Seg-r17 Indicates whether the UE supports RRC segmentation of the MeasurementReportAppLayer message in UL, as specified in TS 38.331 [9]. | UE | No | No | No |

In yet another embodiment, LTE may support streaming and multimedia telephony service for IP multimedia subsystem (IMS) (MTSI), NR may additionally support virtual reality (VR) through Rel-17, and a further release of NR may additionally support at least one of multimedia broadcast multicast services (MBMS) or extended reality (XR).

In operation 325, the operations administration and maintenance (OAM) 304 may provide QoE measurement configuration information to the core network (CN) 306. In operation 330, the CN may activate QoE measurement by transmitting the configuration information to the base station (e.g., the NG-RAN 308). In operation 335, the base station may transfer the configuration information to the UE AS 310 through an RRC message (e.g., an RRCReconfiguration or RRCResume message). In a further embodiment, the RRC message may include IE and related parameter descriptions as shown in Table 2 below.

TABLE 2

```
AppLayerMeasConfig
The IE AppLayerMeasConfig indicates configuration of application layer
measurements.
                    AppLayerMeasConfig information element
-- ASN1START
-- TAG-APPLAYERMEASCONFIG-START
AppLayerMeasConfig-r17 ::=                          SEQUENCE {
    measConfigAppLayerToAddModList-r17                    SEQUENCE (SIZE
(1..maxNrofAppLayerMeas-r17)) OF MeasConfigAppLayer-r17          OPTIONAL, --
Need N
    measConfigAppLayerToReleaseList-r17                   SEQUENCE (SIZE
(1..maxNrofAppLayerMeas-r17)) OF MeasConfigAppLayerId-r17        OPTIONAL, --
Need N
    rrc-SegAllowed-r17                              ENUMERATED {enabled}
OPTIONAL, -- Need M
    ...
}
MeasConfigAppLayer-r17 ::=                          SEQUENCE {
    measConfigAppLayerId-r17                            MeasConfigAppLayerId-r17,
    measConfigAppLayerContainer-r17 OCTET STRING (SIZE (1..8000))
OPTIONAL, -- Need N
    serviceType-r17                                    ENUMERATED {streaming, mtsi, vr,
spare5, spare4, spare3, spare2, spare1}                 OPTIONAL, -- Need M
    pauseReporting                                 BOOLEAN,
    transmissionOfSessionStartStop                     BOOLEAN,
    ran-VisibleParameters-r17                          SetupRelease {RAN-VisibleParameters-r17}
OPTIONAL, -- Need M
    ...
}
RAN-VisibleParameters-r17 ::=                       SEQUENCE {
    ran-VisiblePeriodicity                             ENUMERATED {ms120, ms240, ms480,
ms640, ms1024}                                     OPTIONAL, -- Need S
    numberOfBufferLevelEntries                          INTEGER (1..8)
OPTIONAL, -- Need R
    reportInitialPlayOutDelay                          BOOLEAN,
    ...
}
-- TAG-APPLAYERMEASCONFIG-STOP
-- ASN1STOP
```

AppLayerMeasConfig field descriptions measConfigAppLayerContainer
The field contains configuration of application layer measurements, see Annex L
(normative) in TS 26.247 [XX], clause 16.5 in TS 26.114 [YY] and TS 26.118
[ZZ].
numberOfBufferLevelEntries
The field contains the maximum number of buffer level entries that can be reported
for RAN visible application layer measurements.
pause Reporting
The field indicates whether the transmission of
measurementReportAppLayerContainer is paused or not.
ran-VisiblePeriodicity TABLE 2-continued The field indicates the periodicity of RAN visible reporting. Value ms120 indicates
120 ms, value ms240 indicates 240 ms and so on. If no value is indicated and the
UE is configured with RAN visible reporting, the same periodicity as indicated in
the measConfigAppLayerContainer is used.
reportInitialPlayoutDelay
The field indicates whether the UE shall report Initial Playout Delay for RAN
visible application layer measurements.
rrc-SegAllowed
This field, when received in MeasConfigAappLayerMeasConfigList, indicates that
RRC segmentation of MeasurementReportAppLayer is allowed. It may be present
only if the UE supports RRC message segmentation.
serviceType
Indicates the type of application layer measurement. Value streaming indicates
Quality of Experience Measurement Collection for streaming services (see [XX]),
value mtsi indicates Quality of Experience Measurement Collection for MTSI (see
[YY]). value vr indicates Quality of Experience Measurement Collection for VR
service (see [ZZ]). The network always configures serviceType when application
layer measurements are initially configured and at fullConfig.
transmissionOfSessionStartStop
The field indicates whether the UE shall transmit indications when sessions in the
application layer start and stop. The UE transmits a session start indication upon
configuration of this field if a session already has started in the application layer.

In still another embodiment, the UE AS 310 receiving the
RRC message may operate as shown in Table 3 below.

TABLE 3

5.3.5.x          Application layer configuration
The UE shall:
1>if measConfigAppLayerToAddReleaseList is included in appLayerMeasConfig
   within RRCReconfiguration or RRCResume:
   2>for each measConfigAppLayerId value included in the
      measConfigAppLayerToReleaseList:
      3>forward the measConfigAppLayerId and inform upper layers about the
         release of the application layer measurement configuration including any
         RAN visible configuration;
      3>discard any received application layer measurement report received from
         upper layers;
      3>consider itself not to be configured to send application layer
         measurement report for the measConfigAppLayerId.
1>if measConfigAppLayerToAddModList is included in appLayerMeasConfig
   within RRCReconfiguration or RRCResume:
   2>for each measConfigAppLayerId value included in the
      measConfigAppLayerToAddModList:
      3>if measConfigAppLayerContainer is included for the corresponding
         MeasConfigAppLayer configuration:
         4>forward the measConfigAppLayerContainer, the
            measConfigAppLayerId and the serviceType to upper layers
            considering the serviceType;
      3>consider itself to be configured to send application layer measurement
         report for the measConfigAppLayerId in accordance with 5.7.x;
      3> forward the transmissionOfSessionStartStop, if received, to upper layers;
      3> if ran-VisibleParameters is set to setup and the parameters have been
         received:
         4> forward the measConfigAppLayerId, the ran-VisiblePeriodicity, the
            numberOfBufferLevelEntries and the reportInitialPlayOutDelay to
            upper layers considering the serviceType;
      3> else if ran-VisibleParameters is set to release:
         4> forward the measConfigAppLayerId and inform upper layers about
            the release of the RAN visible application layer measurement
            configuration;
      3> if pauseReporting is set to true:
         4> if at least one segment, but not all segments, of a segmented
            MeasurementReportAppLayer message containing an application layer
            measurement report associated with the measConfigAppLayerId has
            been submitted to lower layers for transmission:
            5> submit the remaining segments of the
               MeasurementReportAppLayer message to lower layers for
               transmission;
         4> suspend submitting application layer measurement report containers
            to lower layers for the application layer measurement configuration
            associated with the measConfigAppLayerId;
         4> store any previously or subsequently received application layer
            measurement report containers associated with the
            measConfigAppLayerId for which no segment, or full message, has
            been submitted to lower layers for transmission;

TABLE 3-continued

```
  3>else if pauseReporting is set to false and if transmission of application
     layer measurement report containers has previously been suspended for
     the application layer measurement configuration associated with the
     measConfigAppLayerId:
     4> submit stored application layer measurement report containers to
        lower layers for the application layer measurements configuration
        associated with the measConfigAppLayerId;
     4> resume submitting application layer measurement report containers to
        lower layers for the application layer measurement configuration
        associated with the measConfigAppLayerId;
  NOTE: The UE may discard reports when the memory reserved for storing
     application layer measurement reports becomes full.
  NOTE: The transmission of RAN visible reports is not paused when
     pauseReporting is set to true.
```

In an embodiment, when the QoE measurement configuration included in the measConfigAppLayerToAddModList is included in the RRC message, in operation 340, the UE AS 310 may transfer the configuration information to an upper layer (e.g., an application layer (UE APP) 312) of the UE through an attention (AT) command Although not illustrated, if the QoE measurement configuration included in the measConfigAppLayerToAddReleaseList is included in the RRC message, the UE AS 310 may send an AT command to delete pre-stored configuration information to the UE APP 312.

The UE APP 312 may perform QoE measurement according to the configuration information received through the AT command of operation 340. In operation 345, the UE APP 312 may report the measurement result (e.g., QoE report) to the UE AS 310 through the AT command according to the configuration information. In operation 350, the UE AS 310 may report the QoE measurement result (e.g., QoE report) to the base station through an RRC message (e.g., a MeasurementReportAppLayer message). In another embodiment, signaling radio bearer 4 (SRB4) may be used to transmit an RRC message including the QoE measurement result. In yet another embodiment, the MeasurementReportAppLayer message may include ASN.1 information and related parameter descriptions as shown in Table 4 below.

TABLE 4

```
MeasurementReportAppLayer
The MeasurementReportAppLayer message is used for sending application layer
measurement report.
Signalling radio bearer: SRB4
RLC-SAP: AM
Logical channel: DCCH
Direction: UE to Network
                    MeasurementReportAppLayer message
-- ASN1START
-- TAG-MEASUREMENTREPORTAPPLAYER-START
MeasurementReportAppLayer-r17 ::=                           SEQUENCE {
    criticalExtensions                              CHOICE {
        measurementReportAppLayerList-r17                   SEQUENCE (SIZE
(1..maxNrofAppLayerMeas-r17)) OF MeasurementReportAppLayer-r17-IEs,
        criticalExtensionsFuture                    SEQUENCE { }
    }
}
MeasurementReportAppLayer-r17-IEs ::= SEQUENCE {
        measConfigAppLayerId-r17                        MeasConfigAppLayerId-r17,
        measurementReportAppLayerContainer-r17   OCTET          STRING
OPTIONAL,
        applicationLayerSessionStatus-r17                  ENUMERATED {started, stopped
OPTIONAL,
        ran-VisibleMeasurements-r17                             RAN-VisibleMeasurements-
r17                                             OPTIONAL,
    lateNonCriticalExtension                           OCTET STRING
OPTIONAL,
    nonCriticalExtension                               SEQUENCE{ }
OPTIONAL
}
RAN-VisibleMeasurements-r17 ::=                     SEQUENCE {
    applicationLayerBufferLevelList-r17                SEQUENCE (SIZE (1..8)) OF
ApplicationLayerBufferLevel                         OPTIONAL,
    initialPlayoutDelay-r17                                  INTEGER (0..30000)
OPTIONAL,
    pdu-SessionIdList-r17                              SEQUENCE (SIZE (1..maxNrofPDU-Sessions-
r17)) OF PDU-SessionID                             OPTIONAL,
    ...
}
ApplicationLayerBufferLevel ::=                     INTEGER (0..30000)
-- TAG-MEASUREMENTREPORTAPPLAYER-STOP
-- ASN1STOP
```

TABLE 4-continued

MeasurementReportAppLayer field descriptions applicationLayerBufferLevel
Indicates the application layer buffer level in ms. Value 1 corresponds to 10ms,
value 2 corresponds to 20 ms and so on. If the buffer level is larger than the
maximum value of 30000 (5 minutes), the UE reports 30000.
application LayerSessionStatus
Indicates that a QoE session in the application layer starts or stops.
initialPlayoutDelay
Indicates the application layer initial playout delay in ms. Value 1 corresponds to
1ms, value 2 corresponds to 2 ms and so on. If the initial playout delay is larger
than the maximum value of 30000ms, the UE reports 30000ms.
measurement ReportAppLayerContainer
The field contains application layer measurements, see Annex L (normative) in TS
26.247 [XX], clause 16.5 in TS 26.114 [YY] and TS 26.118 [ZZ].
pdu-SessionIdList
Contains the identity of the PDU session, or the identities of the PDU sessions, used
for application data flows subject to the RAN visible application layer
measurements.

In a further embodiment, the UE AS may receive the RRC configuration for the QoE measurement report from the network (e.g., the NG-RAN 308) and may transmit the QoE report including the QoE measurement report to the NG-RAN 308 according to the RRC configuration. In still another embodiment, the procedure of the UE AS 310 for reporting QoE measurement may be as shown in Table 5 below.

TABLE 5

5.7.x    Application layer measurement reporting
The purpose of this procedure is to send application layer measurement reports to
the network.
5.7.x.2    Initiation
A UE capable of application layer measurement reporting in RRC_CONNECTED
may initiate the procedure when configured with application layer measurement, i.e.
when appLayerMeasConfig and SRB4 have been configured by the network.
Upon initiating the procedure, the UE shall:
   1>for each measConfigAppLayerId:
      2>if the UE AS has received, but not sent, application layer measurement
        report from upper layers; and
      2> if the application layer measurement reporting has not been suspended for
        the measConfigAppLayerId associated with the application layer
        measurement report according to clause 5.3.5.x:
         3>set the measurementReportAppLayerContainer in the
           MeasurementReportAppLayer message to the received value of the
           application layer measurement report;
      2>set the measConfigAppLayerId in the MeasurementReportAppLayer
        message to the value of the measConfigAppLayerId received together with
        application layer measurement report information;
      2> if session start or stop information has been received from upper layers for
        the measConfigAppLayerId:
         3> set the applicationLayerSessionStatus to the received value of the
           application layer measurement information;
      2> if RAN visible application layer measurement report has been received
        from upper layers:
         3> for each applicationLayerBufferLevel value in the received RAN visible
           application layer measurement report:
           4> set the applicationLayerBufferLevel values in
             the applicationlayerBufferLevelLIst to the buffer level values received
             from the upper layer in the order with the
             first applicationLayerBufferLevel value set to the newest received
             buffer level value, the second applicationLayerBufferLevel value set
             to the second newest received buffer level value, and so on until all the
             buffer level values received from the upper layer have been assigned
             or the configured maximum number
             of applicationLayerBufferLevel values have been set, if any;
         3> set the initialPlayoutDelay to the received value in the RAN visible
           application layer measurement report, if any;
         3> for each PDU session ID value indicated in the received RAN visible
           application layer measurement report, if any:
           4> set the PDU-SessionID field in the pdu-SessionIdList to the indicated
             PDU session ID value;
      2> if the RRC message segmentation is enabled based on the field rrc-
        SegAllowed received in appLayerMeasConfig, and the encoded RRC
        message is larger than the maximum supported size of a packet date
        convergence protocol (PDCP) service data unit (SDU) specified in TS
        38.323 [5]
         3>initiate the UL message segment transfer procedure as specified in clause
           5.7.7;

TABLE 5-continued

```
2>else:
    3>submit the MeasurementReportAppLayer message to lower layers for
        transmission upon which the procedure ends.
```

In operation 355, the base station (e.g., the NG-RAN 308) may transmit the measurement result report to a destination server (e.g., a trace collection entity (TCE) or a multi-cell/multicast coordination entity (MCE)) (hereinafter, referred to as TCE/MCE) 302.

Figure 4:
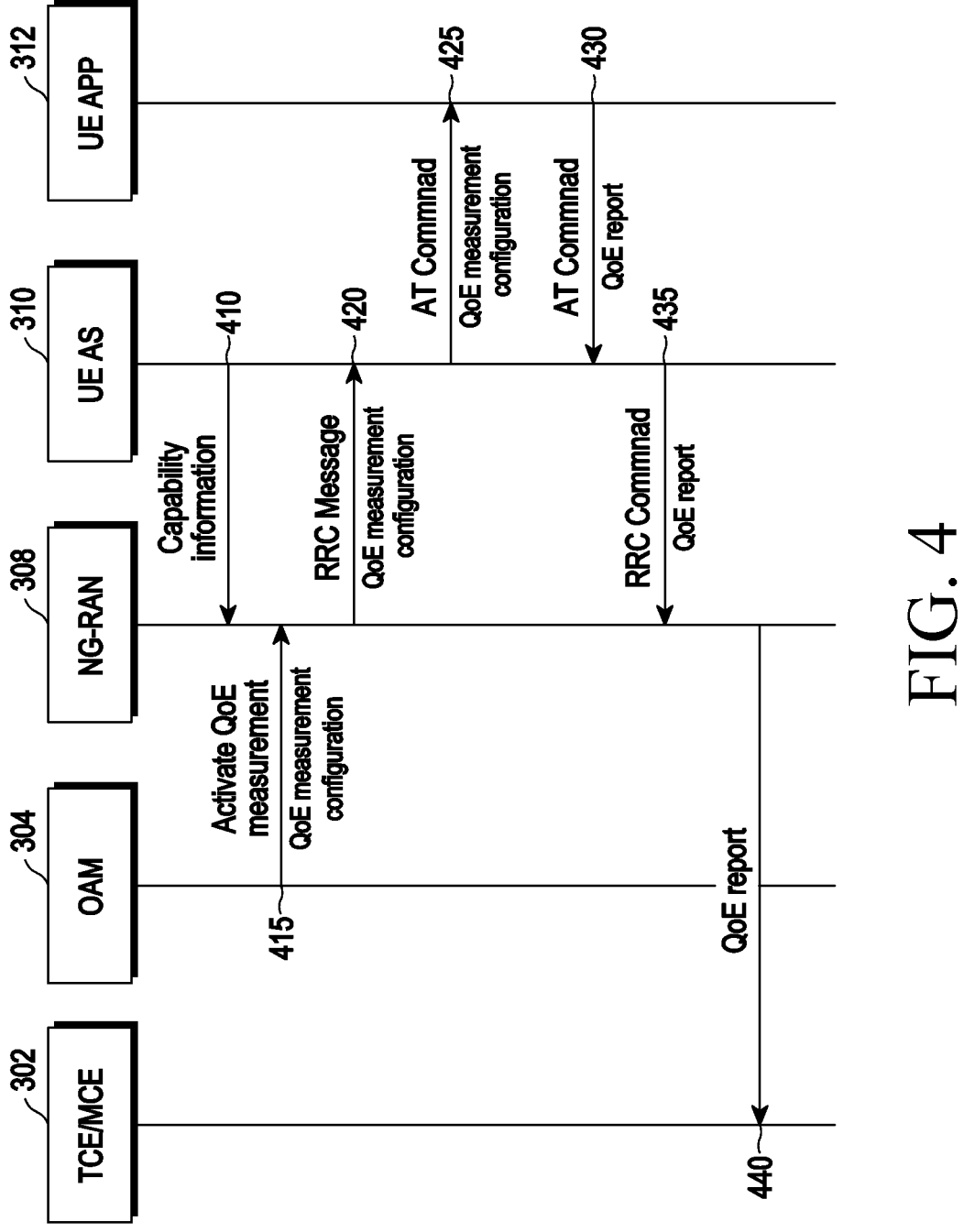
FIG. 4 is a flowchart illustrating a procedure for configuring and reporting a management-based QoE measurement according to an embodiment of the disclosure.

FIG. 4 is a flowchart illustrating a procedure for configuring and reporting a management-based QoE measurement according to an embodiment of the disclosure.

Referring to FIG. 4, the configuration/reporting procedure of the management-based QoE measurement may be substantially similar to the signaling-based procedure (FIG. 3). In another embodiment, operations 410, 415, 420, 425, 430, 435, and 440 may be similar to operations 320, 330, 335, 340, 345, 350, and 355. According to the operation management-based scheme, in operation 415, the OAM 304 may activate the QoE measurement by directly sending the QoE measurement configuration to the base station (e.g., the NG-RAN 308) through, e.g., the Activate QoE measurement message without going through the core network (e.g., the CN 306). Upon receiving the QoE measurement configuration, the base station may find a single UE or a plurality of UEs that meet various conditions (e.g., at least one of area scope, application layer capability, or service type). In operation 420, the base station may transmit the QoE measurement configuration to each of the UEs (e.g., the UE AS 310) through an RRC message (e.g., an RRCReconfiguration message or RRCResume).

The QoE measurement illustrated in FIGS. 3 and 4 may be configured by the OAM 304, and the QoE measurement report generated according to the configuration may be collected by the TCE/MCE 302 and used for network optimization. The UE (e.g., the UE AS 310) transmits the OAM-based QoE measurement report to the base station, but the base station may not be able to read or understand the measurement report. For example, the MeasurmentReportAppLayer message may include the measurement report generated by the UE AS 310 in the form of OCTEC STRING in the measurementReportAppLayerContainer, and the base station or the RRC layer of the base station may not read or understand the measurement report in the form of OCTEC STRING. RAN visible QoE (RVQoE) measurement in 3GPP may be used to address such issues and to allow the base station to read the QoE measurement report and utilize the same for network optimization such as radio resource management.

Figure 5:
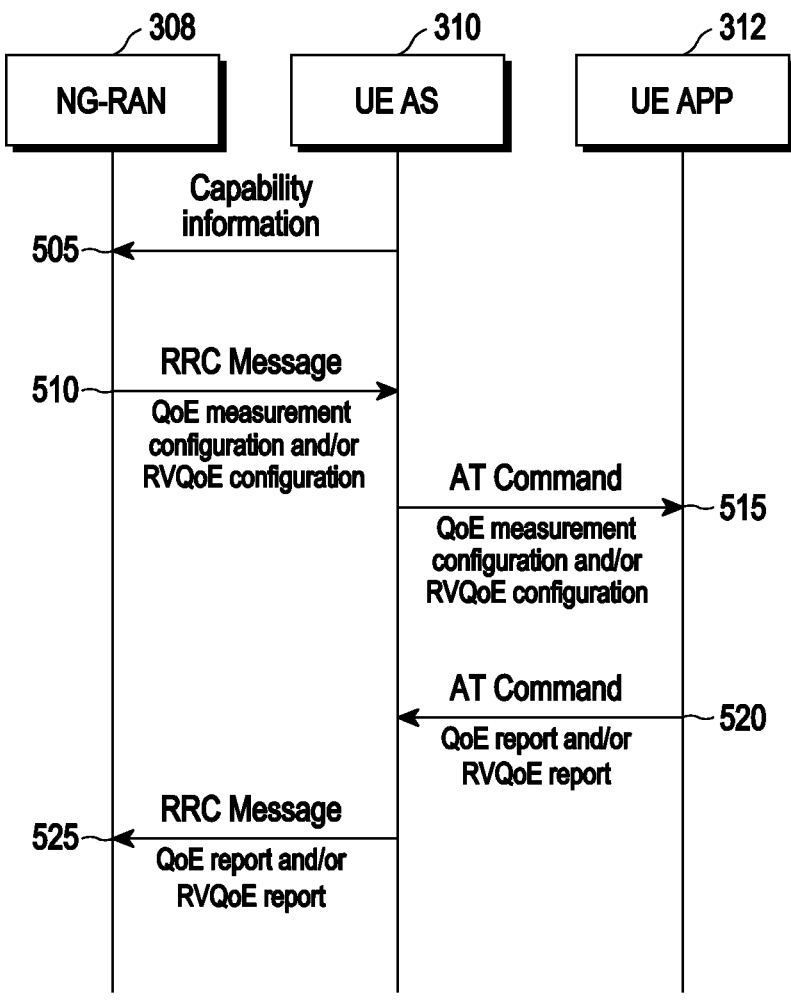
FIG. 5 is a flowchart illustrating a procedure for configuring and reporting a RAN visible QoE measurement according to an embodiment of the disclosure.

FIG. 5 is a flowchart illustrating a procedure for configuring and reporting a RAN visible QoE measurement according to an embodiment of the disclosure.

Referring to FIG. 5, in operation 505, the NR UE 115 (e.g., the UE AS 310) may report information indicating whether RVQoE measurement is supported for each service type (e.g., streaming or VR) to the base station (e.g., the NG-RAN 308) through, e.g., the UECapabilityInformation message. For the streaming service, the UE may include the ran-VisibleQoE-Streaming-MeasReport-r17 parameter in the UECapabilityInformation message, and may include the ran-VisibleQoE-VR-MeasReport-r17 parameter in the UECapabilityInformation message for the VR service.

In operation 510, the base station (e.g., the NG-RAN 308) may generate an RVQoE measurement configuration (e.g., an RVQoE configuration) and may transmit the RVQoE measurement configuration to the UE (e.g., the UE AS 310) through an RRC message. The RRC message may include an RVQoE measurement configuration together with an OAM-based QoE measurement configuration (e.g., QoE measurement configuration). In another embodiment, the RVQoE measurement configuration may be configured or released by the ran-VisibleParameters-r17 parameter (e.g., RAN-VisibleParameters IE). The parameter may include at least one of an RVQoE measurement report period (ran-VisiblePeriodicity), a maximum number of reportable buffer levels (numberOfBufferLevelEntries), or a field (reportInitialPlayoutDelay) indicating whether the UE reports an initial playout delay.

In operation 515, the UE AS 310 may transmit the RVQoE measurement configuration to the UE APP 312 through the AT command. The AT command may include the RVQoE measurement configuration together with the OAM-based QoE measurement configuration. In operation 520, the UE APP 312 may generate an RVQoE measurement report (e.g., an RVQoE report) by performing QoE measurement based on the RVQoE measurement configuration, and may transmit the RVQoE measurement report to the UE AS 310 through an AT command. The AT command may include the RVQoE measurement report together with the OAM-based QoE measurement report.

In operation 525, the UE AS 310 may transmit the RVQoE measurement report to the base station (e.g., the NG-RAN 308) through an RRC message (e.g., a MeasurementReportAppLayer). The RRC message may include the RVQoE measurement report together with the OAM-based QoE measurement report. The RVQoE measurement report may be included in the RAN-VisibleMeasurements IE in the MeasurementReportAppLayer message. In yet another embodiment, the RAN-VisibleMeasurements IE may include at least one of a buffer level list (applicationLayerBufferLevelList) of the UE APP 312, an initial playout delay (initialPlayoutDelay), or an involved packet data unit (PDU) session ID list (pdu-SessionIdList).

In a further embodiment, the base station (e.g., the NG-RAN 308) may perform network optimization by utilizing the RVQoE measurement report. For example, the base station (e.g., the NG-RAN 308) may enhance the QoE of the UE by allocating more radio resources to the UE experiencing poor QoE for a specific service.

In still another embodiment, the RAN visible QoE measurement may be described in detail in Table 6 below.

TABLE 6

```
X.4                          RAN Visible QoE Measurements
RAN visible QoE measurements are configured by the NG-RAN node, where a
subset of QoE metrics is reported from the UE as an explicit IE readable by the NG-
RAN node. RAN visible QoE measurements (e.g., RAN visible QoE metrics, RAN
```

TABLE 6-continued visible QoE values) could be utilized by the NG-RAN node for network
optimization. RAN visible QoE measurements are supported for the DASH
streaming and VR services. The NG-RAN node configures the RAN visible QoE
measurement to collect all or some of the available RAN visible QoE metrics,
where the indication of metric availability is received from the OAM or CN. The set
of available RAN visible QoE metrics is a subset of the metrics which are already
configured as part of QoE measurement configuration encapsulated in the
transparent container. The PDU session ID(s) corresponding to the service that is
subject to QoE measurements can also be reported by the UE along with the RAN
visible QoE measurement results.
RAN visible QoE measurements can be reported with a reporting periodicity
different from the one of regular QoE. If there is no reporting periodicity defined in
the RAN visible QoE configuration, RAN visible QoE reports should be sent
together with the legacy QoE reports.
RAN visible application layer measurement is supported only for streaming and VR
services. The gNB can use RAN visible application layer measurement
configurations to instruct the UE to collect application layer measurements for RRM
purposes. Multiple simultaneous RAN visible application layer measurements
configuration and reports can be supported for RAN visible application layer
measurement, and each RAN visible application layer measurement configuration
and report is identified by the same measConfigAppLayerId as the application layer
measurement configuration and measurement report. gNB configures the required
RAN visible QoE metrics in the RAN visible application measurement
configuration for the UE to report. After receiving the RAN visible application layer
measurement configuration, the UE RRC layer forwards the configuration to the
application layer, indicating the service type, the RRC identifier and the periodicity.
RAN visible application layer configuration can only be configured if there is a
corresponding application layer measurement configuration for the same service
type configured at the UE. The application layer sends the RAN visible application
layer measurement report associated with the RRC identifier to the UE's AS layer.
UE can send both RAN visible application layer measurement reports and the
application layer measurement reports to the gNB in the same
MeasurementReportAppLayer message. gNB can release one or multiple RAN
visible application layer measurement configurations from the UE in one RRC
message at any time.
The UE still reports the configured RAN visible application layer measurements,
even though the corresponding non RAN visible application layer measurement
reporting is paused.

3GPP TR 23.700-60 is a standard document of the SA2 [35]
group titled Study on XR (Extended Reality) and media
services. In an embodiment, to support the XR service, a
packet data unit (PDU) set may be defined as shown in Table
7 below.

TABLE 7

PDU Set: A PDU Set is composed of one or more PDUs carrying the payload of one
unit of information generated at the application level (e.g. a frame or video slice for
XRM Services, as used in TR 26.926). In some implementations all PDUs in a PDU
Set are needed by the application layer to use the corresponding unit of information.
In other implementations, the application layer can still recover parts all or of the
information unit, when some PDUs are missing.

In another embodiment, Table 8 below describes two key
issues based on the PDU set to support the XR service.

TABLE 8

5.4        Key Issue #4: PDU Set integrated packet handling
5.4.1      Description
In current 5G system (5GS), the QoS Flow is the finest granularity of QoS
differentiation in the PDU Session. The 5G QoS characteristics is determined by the
5QI. This implies that each packet in a QoS flow is treated according to the same
QOS requirements.
For XR/media services, a group of packets are used to carry payloads of a PDU Set
(e.g. a frame, video slice/tile).
In media layer, packets in such a PDU Set are decoded/handled as a whole. For
example, the frame/video slice may only be decoded in case all or certain amount of
the packets carrying the frame/video slice are successfully delivered. For example, a
frame within a Group of Pictures (GOP) can only be decoded by the client in case
all frames on which that frame depends are successfully received. Hence the groups
of packets within the PDU Set have inherent dependency on each other in media
layer. Without considering such dependencies between the packets within the PDU TABLE 8-continued set, 5GS may perform a scheduling with low efficiency. For example, the 5GS may randomly drop packet (s) but try to deliver other packets of the same PDU set which are useless to the client and thus waste radio resources.

Also audio samples, haptics applications or remote control operations may benefit if the 5GS considers the PDU Set characteristics.

If such dependency between packets of a PDU Set (e.g. a frame/video slice) can be considered, it's possible to enhance the efficiency and promote user experience.

This key issue proposes to study PDU Set integrated packet handling in 5G network, in which the group of packets belongs to a same PDU Set will be handled in an integrated manner. The key issue includes the following aspects:

-    Which types of PDU Set (e.g. frame/video slice) shall be supported for PDU Set integrated packet handling by 5G network.

NOTE 1: Coordination with SA WG4 is possibly needed.

-    What information should be provided to the 5GS regarding PDU Set for integrated packet handling, and how such information should be provided.

-    How the 5GS identifies that a PDU belongs to a specific PDU Set.

NOTE 2: It is assumed that some header information necessary for the identification of PDUs and it is assumed that the corresponding information is not encrypted.

-    Whether and how to enhance the QoS model and policy control for PDU Set integrated packet handling.

-    Whether and how to perform the PDU Set integrated packet handling in the UE, RAN and/or UPF.

-    What information needs to be provided to the RAN and/or UPF to support PDU Set integrated packet handling in both the downlink and uplink direction.

-    Whether and how to provide information to the UE for PDU Set integrated packet handling.

NOTE 3: Coordination with RAN WGs may be needed.

5.5          Key Issue #5: Differentiated PDU Set Handling 5.5.1        Description XR/media services are characterized by high data rate and low latency. In this release, it is anticipated that the 5GS QoS framework will be enhanced to support different QoS handling for PDU Set. PDU Sets can carry different content, e.g. I/B/P frames, slices/tiles within an I/B/P frame, etc.

This key issue proposes to support differentiated QoS handling considering different importance of PDU Sets e.g. by treating packets (i.e. PDUs) belonging to less important PDU Set(s) differently to reduce the resource wasting. The key issue includes the following aspects:

-    How does the 5GS identify the PDUs of one PDU Set.

-    How does the 5GS determine the importance information for a given PDU Set and/or dependency information between different PDU Sets.

-    Which network entity needs the importance/dependency information associated with the PDU Set and how it receives it.

-    Whether and how to enhance the QoS model and policy control for the importance/dependency information associated with a given PDU Set.

-    Definition of the importance/dependency information enabling differentiated PDU Set handling.

NOTE 1: RAN related aspects will be coordinated with RAN WGs.

NOTE 2: Aspects related to how PDU Sets may depend on each other will be coordinated with SA WG4.

Figure 6:
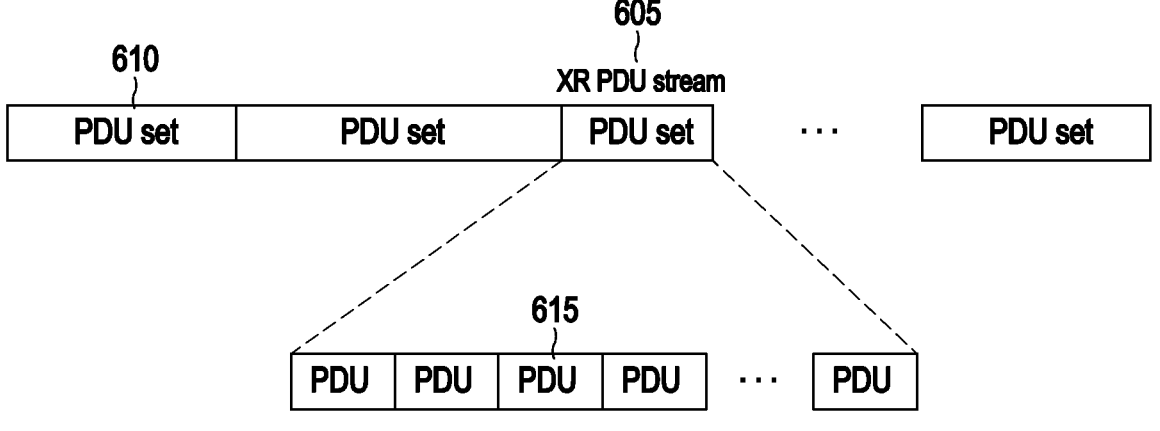
FIG. 6 is a view illustrating a packet data unit (PDU) set according to an embodiment of the disclosure.

FIG. 6 is a view illustrating a PDU set according to an embodiment of the disclosure.

Referring to FIG. 6, for an XR service, the UE (e.g., the NR UE 115) may receive or transmit a PDU stream 605 including the plurality of PDUs. The PDU stream 605 may be divided into units of the PDU set 610, and one PDU set (e.g., the PDU set 610) may include a plurality of PDUs (e.g., including the PDU 615). In another embodiment, different PDU sets may include different XR frames. In yet another embodiment, each video frame according to video compression technology may include an intra (I) frame, a predictive (P) frame, or a bi-predictive Inter (B) frame, and one PDU set may include a plurality of PDUs constituting one I frame. In a further embodiment, one PDU set may include a plurality of PDUs constituting one P frame. In still another embodiment, one PDU set may include a plurality of PDUs constituting one B frame. Each PDU set may be set to have an importance level. In an embodiment, a different value may be set for each PDU set as shown in Table 9 below.

TABLE 9

| 1st importance level | Flow description (e.g. I frame) | |
|---|---|---|
| 2nd importance level | Flow description (e.g. P frame) | Dependent Flow description (e.g. I frame) |
| 3rd importance level | Flow description (e.g. B frame) | Dependent Flow description (e.g. I frame, P frame) |

In another embodiment, since the I frame includes the original data as it is without reference to other frames, the PDU set constituting the I frame may have the highest importance. Since the P frame includes difference data based on (or with reference to) the I frame, the PDU set constituting the P frame may be less important than the PDU set constituting the I frame. Since the B frame includes difference data based on (or with reference to) the I frame and the P frame, the PDU set constituting the B frame may be assigned a lower importance level than the PDU set constituting the I frame or the P frame.

Figure 7:
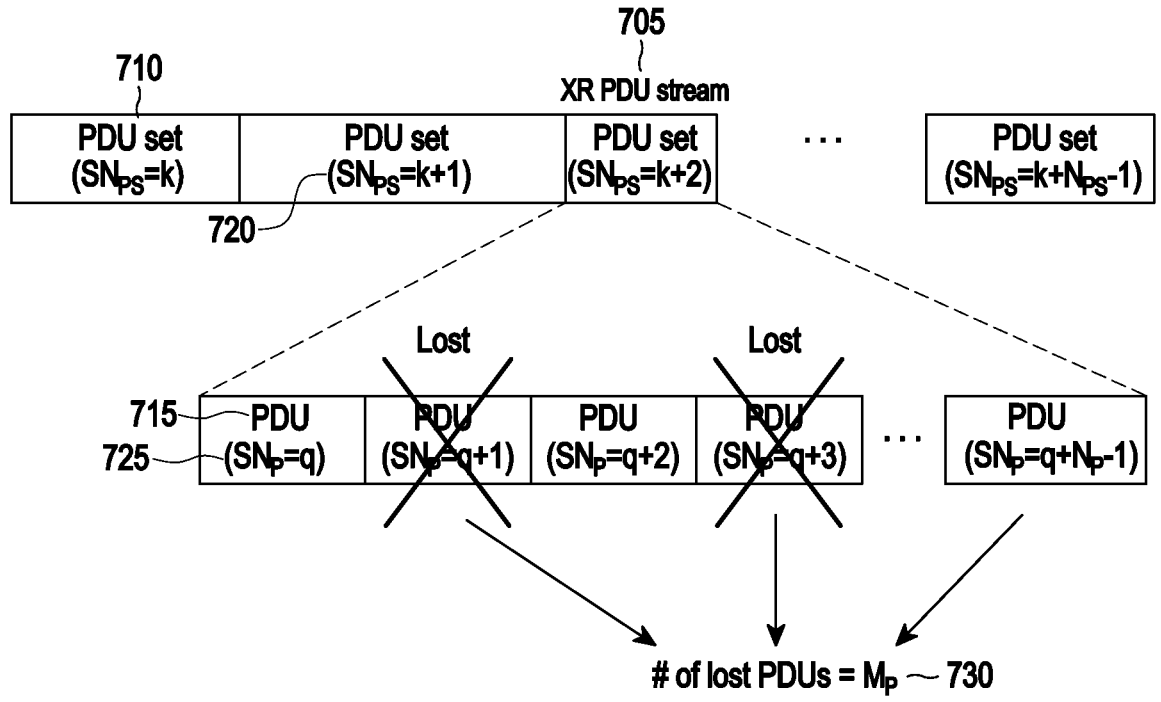
FIG. 7 is a view illustrating an example in which some PDUs are lost in an XR PDU stream received by a UE according to an embodiment of the disclosure.

FIG. 7 is a view illustrating an example in which some PDUs are lost in an XR PDU stream received by a UE according to an embodiment of the disclosure.

Referring to FIG. 7, for an XR service, the UE (e.g., the NR UE 115) may receive a PDU stream 705 including the plurality of PDUs. The PDU stream 705 may be divided into units of the PDU set 710, and one PDU set (e.g., the PDU set 710) may include a plurality of PDUs (e.g., including the PDU 715).

In another embodiment, to identify each PDU set (e.g., PDU set 710), a PDU set ID or sequence number (e.g., $SN_{PS}$ 720) may be defined, and $SN_{PS}$ 720 may increase by 1 every PDU set. For example, if the $SN_{PS}$ of the first PDU set received by the UE (e.g., the NR UE 115) is k and the total number of received PDU sets is $N_{PS}$, the $SN_{PS}$ of the second PDU set may be k+1, the $SN_{PS}$ of the third PDU set may be k+2, and the $SN_{PS}$ of the last received PDU set may be $k+N_{PS}-1$.

In yet another embodiment, for a plurality of PDUs included in one PDU set (e.g., PDU set 710), a PDU ID or sequence number (e.g., $SN_P$ 725) may be defined, $SN_P$ 725 may increase by 1 every PDU. For example, in the PDU set in which the $SN_{PS}$ is k+2, if the $SN_P$ of the first PDU received by the UE is q and the total number of received PDU sets is $N_P$, the $SN_P$ of the second PDU may be q+1, the $SN_P$ of the third PDU may be q+2, and the $SN_P$ of the last received PDU may be $q+N_P-1$.

In a further embodiment, when receiving a service (e.g., an XR service), the application layer (e.g., the UE APP 312) of the UE may include some or all of the following parameters in the QoE measurement report. In still another embodiment, some or all of the following parameters may be configured to the UE by a QoE measurement configuration or an RVQoE configuration.

For example, the UE may receive an upper layer configuration (e.g., at least one of operation 325, operation 330, operation 335, operation 340, operation 415, operation 420, operation 510, or operation 515) indicating to include at least some of the following parameters in a QoE measurement report of the UE from a network node (e.g., a base station), and the UE may include the indicated parameters in the QoE measurement report (at least one of operation 345, operation 350, operation 355, operation 430, operation 435, operation 440, operation 520, or operation 525).

1) The number (e.g., $N_{PS}$) of PDU sets received, observed, or QoE measurement-performed by the application layer of the UE 2) ID or sequence number (e.g., $SN_{PS}=k$) of the first PDU set received, observed, or QoE measurement-performed by the application layer of the UE 3) ID or sequence number (e.g., $SN_{PS}=k+N_{PS}-1$) of the last PDU set received, observed, or QoE measurement-performed by the application layer of the UE 4) The UE may include some or all of the following parameters in the QoE measurement report for each PDU set. In an embodiment, some or all of the following parameters may be configured to the UE by a QoE measurement configuration or an RVQoE configuration. For example, the UE may receive an upper layer configuration (e.g., at least one of operation 325, operation 330, operation 335, operation 340, operation 415, operation 420, operation 510, or operation 515) indicating to include at least some of the following parameters in a QoE measurement report of the UE from a network node (e.g., a base station), and the UE may include the indicated parameters in the QoE measurement report (at least one of operation 345, operation 350, operation 355, operation 430, operation 435, operation 440, operation 520, or operation 525).

4-1) ID or sequence number (e.g., $SN_{PS}=k+2$) of the corresponding PDU set: may be used to indicate that it is a QoE performance indicator for a certain PDU set.

4-2) Total number (e.g., $N_P$) of PDUs in the corresponding PDU set 4-3) Number (e.g., $M_P$, 730) of PDUs lost (or failed in reception or recovery) within the corresponding PDU set: For example, if the PDU where $SN_P$ is q+1 and the PDU where $SN_P$ is q+3 among the PDUs in the PDU set where $SN_{PS}$ is k+2 are lost, $M_P$ may be 2.

4-4) PDU loss ratio within the corresponding PDU set: may indicate the ratio (e.g., $M_P/N_P$) of the number of PDUs lost (or failed in reception or recovery) in the PDU set to the total number of PDUs in the corresponding PDU set and be represented as a ratio between 0 and 1 or percentage.

4-5) Number (e.g., $N_P-M_P$) of successfully received PDUs within the corresponding PDU set 4-6) PDU reception ratio within the corresponding PDU set: may indicate the ratio (e.g., $1-M_P/N_P$) of the number of successfully received PDUs in the PDU set to the total number of PDUs in the corresponding PDU set and be represented as a ratio between 0 and 1 or percentage.

4-7) ID or sequence number (e.g., $SN_P=q+1$, and/or $SN_P=q+3$) of the PDU(s) lost in the corresponding PDU set 4-8) ID or sequence number (e.g., $SN_P=q$, and/or $SN_P=q+2$) of the PDU(s) successfully received in the corresponding PDU set 5) The QoE measurement report for each PDU set may result in overload of the UE and the network. Accordingly, the UE may transmit integrated information (e.g., average or sum) about the plurality of PDU sets through the QoE measurement report. To that end, one group PDU set may be defined. A group PDU set may include a plurality of PDU sets. For example, three PDU sets whose $SN_{PS}$s are 3, 4, and 5 may be defined or set as a first group PDU set, and four PDU sets whose $SN_{PS}$s are 6, 7, 8, and 9 may be defined or set as a second group PDU set. In yet another embodiment, PDU sets included in one group PDU set may have consecutive serial numbers (e.g., $SN_{PS}=3$, 4, 5). In a further embodiment, PDU sets included in one group PDU set may not be consecutive (e.g., $SN_{PS}=2$, 8, and 11).

In still another embodiment, one group PDU set may be mapped to one importance level. For example, PDU sets of importance level 1 may constitute one group PDU set, PDU sets of importance level 2 may constitute another group PDU set, and PDU sets of importance level 3 may constitute another group PDU set. A plurality of group PDU sets may be present for each importance. For example, there may be a plurality of group PDU sets having importance level 2. PDU sets having the same importance level and continuous PDU sets may form at least one group PDU set.

In an embodiment, one group PDU set may be mapped to a plurality of importance levels. For example, PDU sets having importance levels 1 and 2 may constitute one group PDU set, and PDU sets having importance levels 3 and 4 may constitute another group PDU set. The number of PDU sets belonging to one group PDU set may be a variable value set by the network (e.g., setting value=1), or may be a fixed value defined in the standard.

In another embodiment, the UE may transmit a QoE measurement report including some or all of the following parameters per group PDU set. In yet another embodiment, some or all of the parameters to be included in the QoE measurement report may be configured to the UE by a QoE measurement configuration or an RVQoE configuration.

5-1) ID indicating the corresponding group PDU set 5-2) Importance level or importance level list corresponding to the corresponding group PDU set 5-3) ID list or sequence number list (e.g., $SN_{PS}$=k, $SN_{PS}$=k+1, $SN_{PS}$=k+4) of PDU sets included in the corresponding group PDU set: may be used to indicate that it is a QoE performance indicator for certain PDU sets.

5-4) Number of PDU sets included in the corresponding group PDU set 5-5) Total number of PDUs included in the corresponding group PDU set: For example, when three PDU sets are included in the corresponding group PDU set, and the numbers of PDUs included in the PDU sets are $N_{P1}$, $N_{P2}$, and $N_{P3}$, respectively, the parameter value may be $N_{P1}$+$N_{P2}$+$N_{P3}$.

5-6) Number of PDUs lost (or failed in reception or recovery) in the corresponding group PDU set: For example, when three PDU sets are included in the corresponding group PDU set, and the numbers of PDUs lost in the PDU sets are $M_{P1}$, $M_{P2}$, and $M_{P3}$, respectively, the parameter value may be $M_{P1}$+$M_{P2}$+$M_{P3}$.

5-7) PDU loss ratio within the corresponding group PDU set: For example, when three PDU sets are included in the corresponding group PDU set, and the numbers of the PDUs included in the PDU sets are $N_{P1}$, $N_{P2}$, and $N_{P3}$, respectively, and the numbers of the PDUs lost in the PDU sets are $M_{P1}$, $M_{P2}$, and $M_{P3}$, respectively, the parameter may be calculated as $(M_{P1}+M_{P2}+M_{P3})/(N_{P1}+N_{P2}+N_{P3}.)$ and be represented as a ratio between 0 and 1 or percentage.

5-8) Average PDU loss ratio of PDU sets in the corresponding group PDU set: For example, when three PDU sets are included in the corresponding group PDU set, and the numbers of the PDUs included in the PDU sets are $N_{P1}$, $N_{P2}$, and $N_{P3}$, respectively, and the numbers of the PDUs lost in the PDU sets are $M_{P1}$, $M_{P2}$, and $M_{P3}$, respectively, the parameter may be calculated as $(M_{P1}/N_{P1}+M_{P2}/N_{P2}+M_{P3}/N_{P3})/3$ and be represented as a ratio between 0 and 1 or percentage.

5-9) Maximum PDU loss ratio among PDU sets in the corresponding group PDU set: For example, when three PDU sets are included in the corresponding group PDU set, and the numbers of the PDUs included in the PDU sets are $N_{P1}$, $N_{P2}$, and $N_{P3}$, respectively, and the numbers of the PDUs lost in the PDU sets are $M_{P1}$, $M_{P2}$, and $M_{P3}$, respectively, the parameter may be calculated as $\max$ $(M_{P1}/N_{P1}, M_{P2}/N_{P2}, M_{P3}/N_{P3})$ and be represented as a ratio between 0 and 1 or percentage.

5-10) Maximum PDU loss ratios of a designated number X among the PDU sets in the corresponding group PDU set: For example, five PDU sets are included in the corresponding group PDU set, and the numbers of PDUs included in the PDU sets are $N_{P1}$, $N_{P2}$, $N_{P3}$, $N_{P4}$, and $N_{P5}$, respectively, and the numbers of PDUs lost in the PDU sets are $M_{P1}$, $M_{P2}$, $M_{P3}$, $M_{P4}$, and $M_{P5}$, respectively. If X is 3, the UE may report a PDU loss ratio of up to three. In other words, the QoE measurement report may include the maximum PDU loss ratio (e.g., $M_{P1}/N_{P1}$), the second maximum PDU loss ratio (e.g., $M_{P2}/N_{P2}$), and the third maximum PDU loss ratio (e.g., $M_{P3}/N_{P3}$). In a further embodiment, X may be a variable value set by the network (e.g., setting value=2), or may be a fixed value defined in the standard. In still another embodiment, X may be a value set by being compared with the number of PDU sets included in the corresponding group PDU set.

5-11) PDU reception ratio within the corresponding group PDU set: For example, when three PDU sets are included in the corresponding group PDU set, and the numbers of the PDUs included in the PDU sets are $N_{P1}$, $N_{P2}$, and $N_{P3}$, respectively, and the numbers of the PDUs lost in the PDU sets are $M_{P1}$, $M_{P2}$, and $M_{P3}$, respectively, the parameter may be calculated as $1-((M_{P1}+M_{P2}+M_{P3})/(N_{P1}+N_{P2}+N_{P3}.))$ and be represented as a ratio between 0 and 1 or percentage.

5-12) Average PDU reception ratio of PDU sets in the corresponding group PDU set: For example, when three PDU sets are included in the corresponding group PDU set, and the numbers of the PDUs included in the PDU sets are $N_{P1}$, $N_{P2}$, and $N_{P3}$, respectively, and the numbers of the PDUs lost in the PDU sets are $M_{P1}$, $M_{P2}$, and $M_{P3}$, respectively, the parameter may be calculated as $((1-M_{P1}/N_{P1})+(1-M_{P2}/N_{P2})+(1-M_{P3}/N_{P3}))/3$ and be represented as a ratio between 0 and 1 or percentage.

5-13) Minimum PDU reception ratio among PDU sets in the corresponding group PDU set: For example, when three PDU sets are included in the corresponding group PDU set, and the numbers of the PDUs included in the PDU sets are $N_{P1}$, $N_{P2}$, and $N_{P3}$, respectively, and the numbers of the PDUs lost in the PDU sets are $M_{P1}$, $M_{P2}$, and $M_{P3}$, respectively, the parameter may be calculated as $1-\max$ $(M_{P1}/N_{P1}, M_{P2}/N_{P2}, M_{P3}/N_{P3})$ and be represented as a ratio between 0 and 1 or percentage.

5-14) Minimum PDU reception ratios of a designated number Y among the PDU sets in the corresponding group PDU set: For example, when five PDU sets are included in the corresponding group PDU set, and the numbers of PDUs included in the PDU sets are $N_{P1}$, $N_{P2}$, $N_{P3}$, $N_{P4}$, and $N_{P5}$, respectively, and the numbers of PDUs lost in the PDU sets are $M_{P1}$, $M_{P2}$, $M_{P3}$, $M_{P4}$, and $M_{P5}$, respectively, and Y is 3, the UE may report the minimum PDU reception ratio of up to three. In other words, the QoE measurement report may include the minimum PDU reception rate, the second minimum PDU loss rate, and the third minimum PDU loss rate. In an embodiment, Y may be a variable value set by the network (e.g., setting value=3), or may be a fixed value defined in the standard. In another embodiment, Y may be a value set by being compared with the number of PDU sets included in the corresponding group PDU set.

5-15) ID or sequence number list of PDU(s) lost in the corresponding group PDU set: The maximum number of entries that may be included in the corresponding list may be limited, and the maximum number may be variably set by the network (e.g., setting value=4) or may be a fixed value defined in the standard.

5-16) ID or sequence number list of PDU(s) successfully received in the corresponding group PDU set: The maximum number of entries that may be included in the corresponding list may be limited, and the maximum number may be variably set by the network (e.g., setting value=5) or may be a fixed value defined in the standard.

Figure 8:
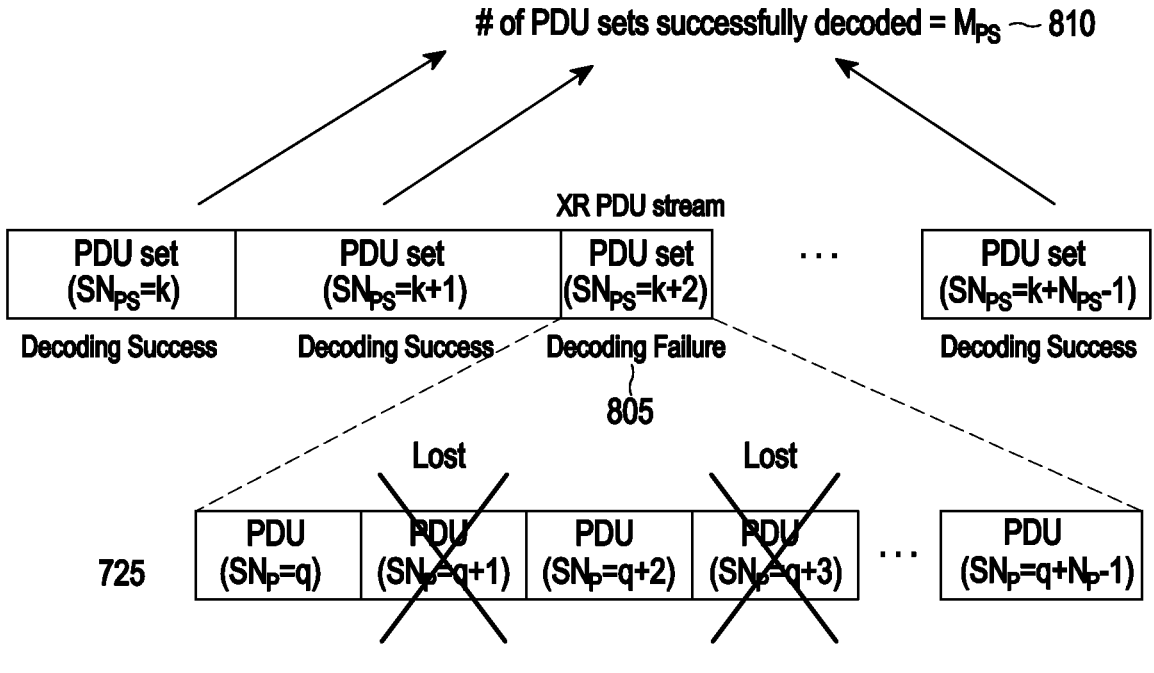
FIG. 8 is a view illustrating an example in which decoding of a PDU set fails in an XR PDU stream received by a UE according to an embodiment of the disclosure.

FIG. 8 is a view illustrating an example in which decoding of a PDU set fails in an XR PDU stream received by a UE according to an embodiment of the disclosure. The description of FIG. 8 may refer to the description of FIG. 7.

Referring to FIG. 8, when some (e.g., one PDU or a few PDUs) of the plurality of PDUs included in the PDU set 805 are lost, the UE may not decode or recover the PDU set 805 (e.g., an image frame). For example, if PDU ($SN_P$=q+1) and PDU ($SN_P$=q+3) are lost, decoding of PDU set 805 with $SN_{PS}$=k+2 may fail.

In another embodiment, when receiving a service (e.g., an XR service), the application layer (e.g., the UE APP 312) of the UE may include some or all of the following parameters in the QoE measurement report. In yet another embodiment, some or all of the parameters to be included in the QoE measurement report may be configured to the UE by a QoE measurement configuration or an RVQoE configuration.

1) The number (e.g., $N_{PS}$) of PDU sets received, observed, or QoE measurement-performed by the application layer of the UE 2) ID or sequence number (e.g., $SN_{PS}$=k) of the first PDU set received, observed, or QoE measurement-performed by the application layer of the UE 3) ID or sequence number (e.g., $SN_{PS}$=k+$N_{PS}$−1) of the last PDU set received, observed, or QoE measurement-performed by the application layer of the UE 4) The number 810 (e.g., $M_{PS}$) of PDU sets successfully decoded among the PDU sets received, observed, or QoE measurement-performed by the application layer of the UE 5) PDU set decoding success ratio: may be defined as a ratio (e.g., $M_{PS}/N_{PS}$) of the number of successfully decoded PDU sets to the number of PDU sets received, observed, or QoE measurement-performed by the application layer of the UE and be represented as a ratio between 0 and 1 or percentage.

6) The number (e.g., $N_{PS}$−$M_{PS}$) of PDU sets failed in decoding among the PDU sets received, observed, or QoE measurement-performed by the application layer of the UE 7) PDU set decoding failure ratio: may be defined as a ratio (e.g., $1$−$M_{PS}/N_{PS}$) of the number of decoding-failed PDU sets to the number of PDU sets received, observed, or QoE measurement-performed by the application layer of the UE and be represented as a ratio between 0 and 1 or percentage.

8) ID or sequence number list (e.g., $SN_{PS}$=k or k+1) of PDU sets successfully decoded 9) ID or sequence number list (e.g., $SN_{PS}$=k+2) of PDU sets failed in decoding 10) For each group PDU set, some or all of the following parameters may be included in the QoE measurement report. In a further embodiment, some or all of the parameters to be included in the QoE measurement report may be configured to the UE by a QoE measurement configuration or an RVQoE configuration.

10-1) ID indicating the corresponding group PDU set 10-2) Importance level or importance level list corresponding to the corresponding group PDU set 10-3) ID list or sequence number list (e.g., $SN_{PS}$=k, $SN_{PS}$=k+1, $SN_{PS}$=k+4) of PDU sets included in the corresponding group PDU set: may be used to indicate that it is a QoE performance indicator for certain PDU sets.

10-4) Number of PDU sets included in the corresponding group PDU set 10-5) ID or sequence number of the first PDU set within the corresponding group PDU set 10-3) ID or sequence number of the last PDU set within the corresponding group PDU set 10-4) Number of PDU sets successfully decoded within the group PDU set 10-5) PDU set decoding success ratio of the corresponding group PDU set: may be defined as a ratio of the number of successfully decoded PDU sets to the number of PDU sets included in the corresponding group PDU set and be represented as a ratio between 0 and 1 or percentage.

10-6) Number of PDU sets failed in decoding within the corresponding group PDU set 10-7) PDU set decoding failure ratio of the corresponding group PDU set: may be defined as a ratio of the number of PDU sets failed in decoding to the number of PDU sets included in the corresponding group PDU set and be represented as a ratio between 0 and 1 or percentage.

10-8) ID or sequence number list of PDU sets successfully decoded within the corresponding group PDU set 10-9) ID or sequence number list of PDU sets failed in decoding within the corresponding group PDU set In still another embodiment, the UE capability information (e.g., operation 320 or operation 505) reported by the UE to the base station may indicate the UE's capability of measuring or reporting some or all of the above-described parameters. In an embodiment, the UE capability information may include a separate indicator for each parameter. In another embodiment, the UE capability information may include a common indicator for each or a combination of the plurality of parameters described above. In yet another embodiment, the UE capability information may include information indicating whether the UE supports QoE measurement for the XR service.

In a further embodiment, the (RV) QoE measurement configuration information (e.g., at least one of operation 325, operation 330, operation 335, operation 340, operation 415, operation 420, operation 510, or operation 515) may include an indicator set by the OAM 304, the base station (e.g., the NG-RAN 308), or the CN 306, e.g., information instructing the UE to include at least one of the above-described parameters in the QoE measurement report. In still another embodiment, the (RV)QoE measurement configuration information may include a separate indicator for each parameter, or may include a common indicator for a plurality of designated parameters.

In an embodiment, the (RV)QoE measurement configuration information (e.g., at least one of operation 325, operation 330, operation 335, operation 340, operation 415, operation 420, operation 510, or operation 515) may include information set by the OAM 304, the base station (e.g., the NG-RAN 308), or the CN 306, e.g., information necessary for reporting the above-described parameters (e.g., including the setting values 1, 2, 3, 4, and 5).

In another embodiment, the UE may report a QoE performance indicator including a QoS flow ID, a data radio bearer (DRB) ID, or a PDU session ID (or a list including a plurality of IDs) corresponding to each service (e.g., an XR service) to the base station (e.g., the NG-RAN 308), the TCE 302, or the OAM 304 (e.g., through a QoE report). In yet another embodiment, the QoE performance indicator may be configured to the UE by a QoE measurement configuration and/or an RVQoE configuration.

In a further embodiment, the QoE performance indicator measured and reported by the UE (e.g., the NR UE 115) may include a user experience delay. The user experience delay may be defined as a time from a user action (e.g., a movement of the user carrying an XR device (e.g., a UE)) to a reaction of the UE according to the action (e.g., reproduction of a frame of an updated XR image). In still another embodiment, the UE may measure and report the user experience delay for each PDU set (e.g., one frame of an XR image) or for each group PDU set. The user experience delay may include an average value for a plurality of PDU sets.

In an embodiment, the QoE performance indicator measured and reported by the UE (e.g., the NR UE 115) may include a predicted buffer level. In a general streaming service, image frames played in the future are predetermined and may be stored in a playback buffer before playback. For example, when the UE is watching a one-hour streaming service and the current viewing time of the user is 30 minutes and seconds, the UE may provide the user with a streaming service without delay by previously storing the image (e.g., image frames) to be played in the future from 30 minutes and 15 seconds to 31 minutes and 15 seconds in the playback buffer.

However, in the case of a service such as XR, the image played to the user may depend on the user's action. For example, when the user turns his/her head to the right, the image including the right space of the virtual world may have to be played, and when the user turns his/her head to the left, the image including the right space of the virtual world may have to be played. Therefore, in order to provide an XR service without delay to the user, a much larger amount of image data as compared to the streaming service needs to be stored in the playback buffer before playback (although most of the image data may not be actually used). Therefore, the predicted buffer level of the UE may be an important QoE performance indicator. In another embodiment, the QoE performance indicator of the UE may include a buffer level for each PDU set or for each group PDU set. In yet another embodiment, the QoE performance indicator of the UE may include a ratio of actually used (e.g., an image frame actually played by the user) data of the stored buffer level.

In embodiments of the disclosure, the QoE measurement/configuration/report/result may refer to or include the RVQoE measurement/configuration/report/result, respectively. Conversely, the RVQoE measurement/configuration/report/result may refer to or include the QoE measurement/configuration/report/result, respectively.

Figure 9:
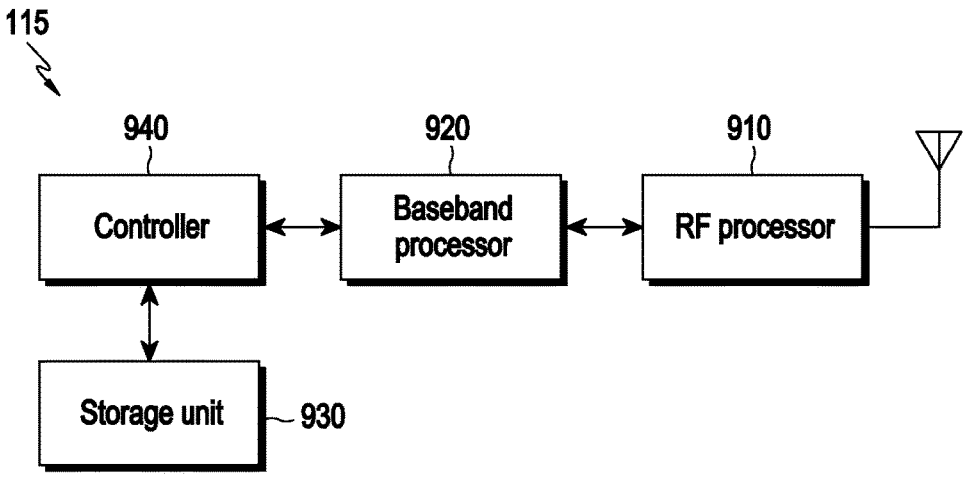
FIG. 9 is a block diagram illustrating a structure of a UE according to an embodiment of the disclosure.

FIG. 9 is a block diagram illustrating a structure of a UE according to an embodiment of the disclosure.

Referring to FIG. 9, a UE (e.g., the NR UE 115) may include a radio frequency (RF) processor 910, a baseband processor 920, a storage unit 930, and a controller 940.

The RF processor 910 may perform functions for transmitting and receiving signals through a wireless channel, such as band conversion and amplification. The RF processor 910 may up-convert a baseband signal provided from the baseband processor 920 into an RF band signal and then transmit the RF band signal through an antenna, and may down-convert an RF band signal received through the antenna into a baseband signal. In another embodiment, the RF processor 910 may include at least one of a transmission filter, a reception filter, an amplifier, a mixer, an oscillator, a digital-to-analog converter (DAC), or an analog-to-digital converter (ADC).

Although only one antenna is illustrated in FIG. 9, in yet another embodiment, the UE may include a plurality of antennas. In a further embodiment, the RF processor 910 may include a plurality of RF chains. In still another embodiment, the RF processor 910 may perform beamforming. For beamforming, the RF processor 910 may adjust the phase and magnitude of each of the signals transmitted/received through the plurality of antennas or antenna elements. Further, the RF processor 910 may perform multiple input multiple output (MIMO), and may process multiple layers when performing the MIMO operation.

The baseband processor 920 performs the function of conversion between a baseband signal and a bit stream according to the physical layer specifications of at least one radio access technology. For example, when transmitting data, the baseband processor 920 may generate complex symbols by encoding and modulating a transmission bit string. When receiving data, the baseband processor 920 may reconstruct a reception bit string by demodulating and decoding the baseband signal provided from the RF processor 910. In an embodiment, in the case of following the orthogonal frequency division multiplexing (OFDM) scheme, when transmitting data, the baseband processor 920 may generate complex symbols by encoding and modulating the transmission bit stream, map the complex symbols to a subcarrier, and then configure OFDM symbols through inverse fast Fourier transform (IFFT) operation and cyclic prefix (CP) insertion. When receiving data, the baseband processor 920 may divide the baseband signal provided from the RF processor 910 into OFDM symbol units, reconstruct signals mapped to subcarriers through a fast Fourier transform (FFT) operation, and then reconstruct an information bit string through demodulation and decoding.

The baseband processor 920 and the RF processor 910 may transmit and receive signals as described above. Accordingly, the baseband processor 920 and the RF processor 910 may be referred to as a transmitter, a receiver, a transceiver, or a communication unit. In another embodiment, at least one of the baseband processor 920 and the RF processor 910 may include one or more communication modules to support a plurality of different radio access technologies. In yet another embodiment, at least one of the baseband processor 920 and the RF processor 910 may include one or more communication modules (e.g., communication circuits) to process signals of different frequency bands. For example, the different radio access technologies may include a wireless local area network (LAN) (e.g., Institute of Electrical and Electronics Engineers (IEEE) 802.11) or a cellular radio access technology (e.g., LTE). In a further embodiment, the different frequency bands may include a super-high frequency (SHF) (e.g., 2.NRHz or NRHz) band or millimeter wave (mmWave) (e.g., 60 GHz) band.

The storage unit 930 may store data such as a basic program (e.g., an executable code of the UE AS 310) for operating the UE, an application program (e.g., an executable code of the UE APP 312), or configuration information. In still another embodiment, the storage unit 930 may store information related to an access node (e.g., the NG-RAN 308) that performs wireless communication using a radio access technology. The storage unit 930 may provide the stored data according to a request from the controller 940.

The controller 940 may control the overall operations of the NR UE 115 according to at least one of the above-described embodiments or a combination thereof. In an embodiment, the controller 940 may include a UE AS 310 and/or a UE APP 312 operating according to at least one of the above-described embodiments or a combination thereof. The controller 940 may transmit and receive signals through the baseband processor 920 and the RF processor 910. The controller 940 may record and read data in the storage unit 930. To that end, the controller 940 may include at least one processor or processing circuit. For example, the controller 940 may include a communication processor (CP) that performs control for communication and an application processor (AP) that performs upper layer processing such as an application program.

Figure 10:
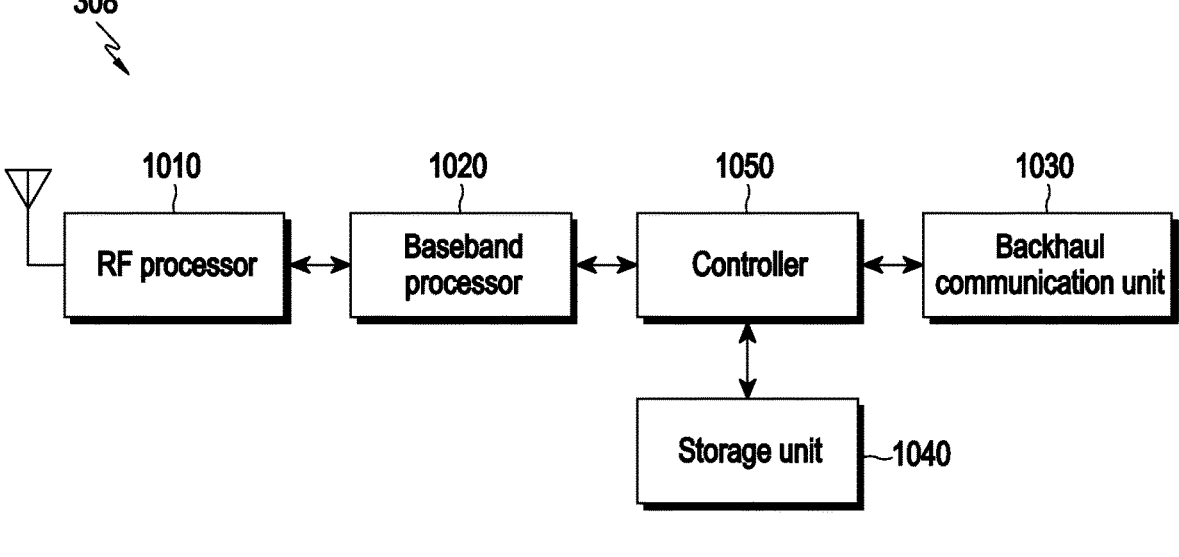
FIG. 10 is a block diagram illustrating a configuration of a base station according to an embodiment of the disclosure.

FIG. 10 is a block diagram illustrating a configuration of a base station according to an embodiment of the disclosure.

Referring to FIG. 10, a base station (e.g., the gNB 110 or the NG-RAN 308) may include an RF processor 1010, a baseband processor 1020, a backhaul communication unit 1030, a storage unit 1040, and a controller 1050.

The RF processor 1010 may perform functions for transmitting/receiving signals through a radio channel, such as signal band conversion or amplification. The RF processor 1010 may up-convert a baseband signal provided from the baseband processor 1020 into an RF band signal and then transmit the RF band signal through an antenna, and may down-convert an RF band signal received through the antenna into a baseband signal. In another embodiment, the RF processor 1010 may include at least one of a transmission filter, a reception filter, an amplifier, a mixer, an oscillator, a DAC, or an ADC.

Although only one antenna is illustrated in FIG. 10, in yet another embodiment, the base station may include a plurality of antennas. In an embodiment, the RF processor 1010 may include a plurality of RF chains. In a further embodiment, the RF processor 1010 may perform beamforming. For beamforming, the RF processor 1010 may adjust the phase and magnitude of each of the signals transmitted/received through the plurality of antennas or antenna elements. The RF processor 1010 may perform a downward MIMO operation by processing one or more layers.

The baseband processor 1020 performs the function of conversion between a baseband signal and a bit stream according to the physical layer specifications of at least one radio access technology. For example, when transmitting data, the baseband processor 1020 may generate complex symbols by encoding and modulating a transmission bit string. When receiving data, the baseband processor 1020 may reconstruct a reception bit string by demodulating and decoding the baseband signal provided from the RF processor 1010. In still another embodiment, in the case of following the OFDM scheme, when transmitting data, the baseband processor 1020 may generate complex symbols by encoding and modulating the transmission bit stream, map the complex symbols to a subcarrier, and then configure OFDM symbols through IFFT operation and CP insertion. When receiving data, the baseband processor 1020 may divide the baseband signal provided from the RF processor 1010 into OFDM symbol units, reconstruct signals mapped to subcarriers through an FFT operation, and then reconstruct an information bit string through demodulation and decoding.

The baseband processor 1020 and the RF processor 1010 may transmit and receive signals as described above. Accordingly, the baseband processor 1020 and the RF processor 1010 may be referred to as a transmitter, a receiver, a transceiver, a communication unit, or a wireless communication unit. In an embodiment, at least one of the baseband processor 1020 and the RF processor 1010 may include one or more communication modules to support a plurality of different radio access technologies. In another embodiment, at least one of the baseband processor 1020 and the RF processor 1010 may include one or more communication modules (e.g., communication circuits) to process signals of different frequency bands.

The backhaul communication unit 1030 may provide an interface for communicating with other nodes in the network. In yet another embodiment, the backhaul communication unit 1030 may convert the bit string transmitted from the base station to another node (e.g., another base station or a core network entity) into a physical signal and converts the physical signal received from another node into a bit stream.

The storage unit 1040 may store a basic program for operating the base station, application programs, configuration information, or other data. In a further embodiment, the storage unit 1040 may store information about a bearer allocated to the connected UE (e.g., the NR UE 115) and a measurement result (e.g., QoE report) reported from the connected UE. In still another embodiment, the storage unit 1040 may store information that serves as a reference for determining whether to provide multiple connections to the UE or stop. The storage unit 1040 may provide the stored data according to a request from the controller 1050.

The controller 1050 may control the overall operations of the base station (e.g., NG-RAN 308) according to at least one of the above-described embodiments or a combination thereof. The controller 1050 may transmit and receive signals through the baseband processor 1020 and the RF processor 1010 or through the backhaul communication unit 1030. The controller 1050 records and reads data in/from the storage unit 1040. To that end, the controller 1050 may include at least one processor or processing circuit.

According to an embodiment, a method for configuring a quality measurement by a network node in a mobile communication system may comprise receiving (e.g., operation 320, operation 410, or operation 505), from a UE, performance information indicating that the UE supports a QoE measurement for an XR service, transmitting (e.g., operation 335, operation 420, or operation 510), to the UE, a QoE measurement configuration indicating parameters to be included in a QoE measurement report, and receiving (e.g., operation 350, operation 435, or operation 525), from the UE, the QoE measurement report including at least one of the parameters.

According to another embodiment, a network node (e.g., NG-RAN 308) configuring a quality measurement in a mobile communication system may comprise a transceiver, an RF processor 1010 or baseband processor 1020, and a controller 1050 configured to control the transceiver. The controller may be configured to receive, from a UE, performance information indicating that the UE supports a QoE measurement for an XR service, transmit, to the UE, a QoE measurement configuration indicating parameters to be included in a QoE measurement report, and receive, from the UE, the QoE measurement report including at least one of the parameters.

According to yet another embodiment, a method for performing a quality measurement by a UE in a mobile communication system may comprise transmitting (e.g., operation 320, operation 410, or operation 505), to a base station, performance information indicating that the UE supports a QoE measurement for an XR service, receiving (e.g., operation 335, operation 420, or operation 510), from the base station, a QoE measurement configuration indicating parameters to be included in a QoE measurement report, and transmitting (e.g., operation 350, operation 435, or operation 525), to the base station, the QoE measurement report including at least one of the parameters.

According to a further embodiment, a NR UE 115 performing a quality measurement in a mobile communication system may comprise a transceiver (e.g., an RF processor 910 and/or baseband processor 920), and a controller 940 configured to control the transceiver. The controller may be configured to transmit, to a base station, performance information indicating that the UE supports a QoE measurement for an XR service, receive, from the base station, a QoE measurement configuration indicating parameters to be included in a QoE measurement report, and transmit, to the base station, the QoE measurement report including at least one of the parameters.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for configuring a quality measurement by a base station in a mobile communication system, the method comprising:

receiving, from a user equipment (UE), capability information indicating that the UE supports a quality of experience (QoE) measurement for an extended reality (XR) service;

transmitting, to the UE, a QoE measurement configuration indicating parameters to be reported for the QoE measurement; and receiving, from the UE, a QoE measurement report including a number of packet data units (PDUs) in a PDU set, a number of PDUs lost in the PDU set, and a PDU loss rate in the PDU set, based on the QoE measurement configuration, wherein the PDU loss rate in the PDU set is determined as a ratio of the number of PDUs lost to the number of PDUs in the PDU set, and wherein the PDU set is related to the XR service.

2. The method of claim 1, wherein the QoE measurement report further includes at least one of:

a number of PDU sets where the QoE measurement is performed in an application layer of the UE, a first PDU set ID where the QoE measurement is performed in the application layer of the UE, or a last PDU set ID where the QoE measurement is performed in the application layer of the UE.

3. The method of claim 1, wherein the QoE measurement report further includes at least one of:

a PDU set ID indicating at least one PDU set used for the QoE measurement, a number of PDUs successfully received in the PDU set, a PDU reception rate in the PDU set, a PDU ID indicating a PDU lost in the PDU set, or a PDU ID indicating a PDU successfully received in the PDU set.

4. A method for performing a quality measurement by a user equipment (UE) in a mobile communication system, the method comprising:

transmitting, to a base station, capability information indicating that the UE supports a quality of experience (QoE) measurement for an extended reality (XR) service;

receiving, from the base station, a QoE measurement configuration indicating parameters to be reported for the QoE measurement; and transmitting, to the base station, a QoE measurement report including a number of packet data units (PDUs) in a PDU set, a number of PDUs lost in the PDU set, and a PDU loss rate in the PDU set, based on the QoE measurement configuration, wherein the PDU loss rate in the PDU set is determined as a ratio of the number of PDUs lost to the number of PDUs in the PDU set, and wherein the PDU set is related to the XR service.

5. The method of claim 4, wherein the QoE measurement report further includes at least one of:

a number of PDU sets where QoE measurement is performed in an application layer of the UE, a first PDU set ID where the QoE measurement is performed in the application layer of the UE, or a last PDU set ID where the QoE measurement is performed in the application layer of the UE.

6. The method of claim 4, wherein the QoE measurement report further includes at least one of:

a PDU set ID indicating at least one PDU set used for the QoE measurement, a number of PDUs successfully received in the PDU set, a PDU reception rate in the PDU set, a PDU ID indicating a PDU lost in the PDU set, or a PDU ID indicating a PDU successfully received in the PDU set.

7. A base station for configuring a quality measurement in a mobile communication system, the base station comprising:

a transceiver; and at least one processor coupled to the transceiver, wherein the at least one processor is configured to:

receive, from a user equipment (UE), capability information indicating that the UE supports a quality of experience (QoE) measurement for an extended reality (XR) service, transmit, to the UE, a QoE measurement configuration indicating parameters to be reported for the QoE measurement, and receive, from the UE, a QoE measurement report including a number of packet data units (PDUs) in a PDU set, a number of PDUs lost in the PDU set, and a PDU loss rate in the PDU set, based on the QoE measurement configuration, wherein the PDU loss rate in the PDU set is determined as a ratio of the number of PDUs lost to the number of PDUs in the PDU set, and wherein the PDU set is related to the XR service.

8. The base station of claim 7, wherein the QoE measurement report further includes at least one of:

a number of PDU sets where QoE measurement is performed in an application layer of the UE, a first PDU set ID where the QoE measurement is performed in the application layer of the UE, or a last PDU set ID where the QoE measurement is performed in the application layer of the UE.

9. The base station of claim 7, wherein the QoE measurement report further includes at least one of:

a PDU set ID indicating at least one PDU set used for the QoE measurement, a number of PDUs successfully received in the PDU set, a PDU reception rate in the PDU set, a PDU ID indicating a PDU lost in the PDU set, or a PDU ID indicating a PDU successfully received in the PDU set.

10. A user equipment (UE) for performing a quality measurement in a mobile communication system, the UE comprising:

a transceiver; and at least one processor coupled to the transceiver, wherein the at least one processor is configured to:

transmit, to a base station, capability information indicating that the UE supports a quality of experience (QoE) measurement for an extended reality (XR) service, receive, from the base station, a QoE measurement configuration indicating parameters to be reported for the QoE measurement, and transmit, to the base station, a QoE measurement report including a number of packet data units (PDUs) in a PDU set, a number of PDUs lost in the PDU set, and a PDU loss rate in the PDU set, based on the QoE measurement configuration, wherein the PDU loss rate in the PDU set is determined as a ratio of the number of PDUs lost to the number of PDUs in the PDU set, and wherein the PDU set is related to the XR service.

11. The UE of claim 10, wherein the QoE measurement report further includes at least one of:

a number of PDU sets where QoE measurement is performed in an application layer of the UE, a first PDU set ID where the QoE measurement is performed in the application layer of the UE, or a last PDU set ID where the QoE measurement is performed in the application layer of the UE.

12. The UE of claim 10, wherein the QoE measurement report further includes at least one of:

a PDU set ID indicating at least one PDU set used for the QoE measurement, a PDU reception rate in the PDU set, a PDU ID indicating a PDU lost in the PDU set, or a PDU ID indicating a PDU successfully received in the PDU set.

* * * * *